(12) United States Patent
MacLeod et al.

(10) Patent No.: US 7,389,335 B2
(45) Date of Patent: Jun. 17, 2008

(54) WORKFLOW MANAGEMENT BASED ON AN INTEGRATED VIEW OF RESOURCE IDENTITY

(75) Inventors: Stewart P. MacLeod, Woodinville, WA (US); Kim Cameron, Bellevue, WA (US); James H. Booth, Issaquah, WA (US); Jonathan A. Fischer, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 09/995,004

(22) Filed: Nov. 26, 2001

(65) Prior Publication Data

US 2003/0105654 A1   Jun. 5, 2003

(51) Int. Cl.
*G06F 15/173* (2006.01)
(52) U.S. Cl. .................. 709/223; 709/227; 705/26
(58) Field of Classification Search ............... 709/231, 709/217, 226, 225, 223, 227; 705/9, 26; 707/10, 1
See application file for complete search history.

(56) References Cited

U.S. PATENT DOCUMENTS

| | | | |
|---|---|---|---|
| 5,313,633 A | 5/1994 | Tomita et al. |
| 5,566,333 A | 10/1996 | Olson et al. |
| 5,581,737 A | 12/1996 | Dahlen et al. |
| 5,665,018 A | 9/1997 | Miyata |
| 5,692,129 A | 11/1997 | Sonderegger et al. |
| 5,790,789 A * | 8/1998 | Suarez ....................... 709/202 |
| 5,802,511 A | 9/1998 | Kouchi et al. |
| 5,812,134 A | 9/1998 | Pooser et al. |
| 5,859,978 A | 1/1999 | Sonderegger et al. |
| 5,875,446 A | 2/1999 | Brown et al. |
| 5,930,369 A | 7/1999 | Cox et al. |
| 5,970,496 A | 10/1999 | Katzenberger |
| 5,987,471 A | 11/1999 | Bodine et al. |
| 5,999,911 A * | 12/1999 | Berg et al. ....................... 705/9 |
| 6,016,499 A | 1/2000 | Ferguson |
| 6,064,764 A | 5/2000 | Bhaskaran et al. |
| 6,219,053 B1 | 4/2001 | Tachibana et al. |

(Continued)

FOREIGN PATENT DOCUMENTS

EP   0951183   10/1999

(Continued)

OTHER PUBLICATIONS

"Collusion-secure fingerprinting for digital data" Information Theory IEEE Transactionon vol. 44 Issue 5 Sep. 1998 pp. 1897-1905.

(Continued)

*Primary Examiner*—Jason Cardone
*Assistant Examiner*—Adnan M Mirza
(74) *Attorney, Agent, or Firm*—Lee & Hayes, PLLC

(57) ABSTRACT

The described arrangements and procedures use a directory, with its integrated view of resource identity across a distributed system to dynamically execute and manage workflow solutions responsive to changes in the directory. Specifically, a state change to an object in a directory is detected. Responsive to detecting the state change, the state change is mapped to a corresponding workflow, which includes sequences of tasks. The identified sequences of tasks are then executed to achieve a desired state in the directory. The desired state is based on the detected state change.

55 Claims, 9 Drawing Sheets

U.S. PATENT DOCUMENTS

| | | | |
|---|---|---|---|
| 6,223,145 B1 | 4/2001 | Hearst | |
| 6,243,480 B1 | 6/2001 | Zhao et al. | |
| 6,285,366 B1 | 9/2001 | Ng et al. | |
| 6,289,382 B1* | 9/2001 | Bowman-Amuah | 709/226 |
| 6,317,749 B1 | 11/2001 | Ghatate | |
| 6,345,100 B1 | 2/2002 | Levine | |
| 6,345,104 B1 | 2/2002 | Rhoads | |
| 6,434,564 B2 | 8/2002 | Ebert | |
| 6,442,557 B1 | 8/2002 | Buteau et al. | |
| 6,463,420 B1 | 10/2002 | Guidice et al. | |
| 6,489,970 B1 | 12/2002 | Pazel | |
| 6,535,884 B1 | 3/2003 | Thornton et al. | |
| 6,556,984 B1 | 4/2003 | Zien | |
| 6,564,263 B1 | 5/2003 | Bergman et al. | |
| 6,564,370 B1 | 5/2003 | Hunt | |
| 6,636,250 B1 | 10/2003 | Gasser | |
| 6,643,652 B2 | 11/2003 | Helgeson et al. | |
| 6,708,161 B2 | 3/2004 | Tenorio et al. | |
| 6,721,758 B1 | 4/2004 | Jex et al. | |
| 6,754,666 B1 | 6/2004 | Brookler et al. | |
| 6,754,822 B1 | 6/2004 | Zhao | |
| 6,785,667 B2 | 8/2004 | Orbanes et al. | |
| 6,807,634 B1 | 10/2004 | Braudaway et al. | |
| 6,859,217 B2 | 2/2005 | Robertson et al. | |
| 6,901,515 B1 | 5/2005 | Muratani | |
| 6,938,046 B2 | 8/2005 | Cooke et al. | |
| 6,957,230 B2 | 10/2005 | Cameron et al. | |
| 2001/0034733 A1 | 10/2001 | Prompt et al. | |
| 2001/0047385 A1 | 11/2001 | Tuatini | |
| 2002/0009208 A1 | 1/2002 | Alattar et al. | |
| 2002/0046211 A1 | 4/2002 | Fragapane et al. | |
| 2002/0083048 A1* | 6/2002 | Tenorio et al. | 707/2 |
| 2002/0169744 A1 | 11/2002 | Cooke et al. | |
| 2002/0191809 A1 | 12/2002 | Kirovski et al. | |
| 2003/0088654 A1 | 5/2003 | Good et al. | |
| 2004/0002982 A1 | 1/2004 | Ersek et al. | |
| 2004/0143742 A1 | 7/2004 | Muratani | |

FOREIGN PATENT DOCUMENTS

WO      WO 97/34391      9/1997

OTHER PUBLICATIONS

"Secure spread spectrum watermarking for multimedia" Image Processing IEEE Transactions on vol. 6 Issue 12 Dec. 1997 pp. 1673-1687.

"Digital watermarking of images and video using direct sequence spread spectrum techniques" Electrical and Computer Engineering 1999 IEEE Canadian Conference on vol. 1 1999 pp. 116-121.

"Fast public-key watermarking of compressed video" Proceedings Interantional Conference on Image Processing 26-29 Ocv. 1997 pp. 528-531 vol. 1.

"Optimum watermark detection and embedding in digital images" Multimedia Signal Processing 1998 IEEE Second Workshop on 1998 pp. 285-290.

Chita, C.; "Hierarchy Visualization" Publication found on the internet in May 2004 http://www.cs.ubc.ca/~tmm/courses/cpsc533c-04-spr/slides/0331.cchita2.6up.pdf.

Biron et al."XML Schema Part 2: Datatypes" published on the internet at http://www.w3.org/TR/smlschema-2/ May 2001 pp. 1-21 (of 181).

Baeza-Yates et al., "New Approaches to Information Management: Attribute-Centric Data Systems", String Processing and Information Retrieval, 2000. Spire 2000. Proceedings. Seventh International Symposium on Sep. 27-29, 2000. Piscataway, NJ, USA, IEEE, Sep. 27, 2000, pp. 17-27.

Fumas et al, "Multitrees: Enriching and Reusing Hierarchical Structure", 1994. Hum Factors Comput Syst; Conference Proceedings on Human Factors in Computing Systems; Celebrating Independence 1994. Published by ACM. New York, NY, USA, pp. 330-336.

Yamamoto, et al., "A Method of Image Watermarking which can Detect All Illegal Users in Collusion", retrieved on 1998 Symposium on Cryptography and Information Security, Hammanako, Japan, Jan. 28-31, 1998, English Language Translation, pp. 08.

Finnigan, et al., "The software bookshelf", IBM, 1997, pp. 1-39.

T. Howes, et al., "The LDAP URL Format", The Internet Society, Dec. 1997, 8 pages.

M. Wahl, "A Summary of the X.500(96) User Schema for use with LDAPv3", The internet Society, Dec. 1997, 20 pages.

M. Wahl, et al., "Lightweight Directory Access Protocol (v3)", Internet Society, Dec. 1997, 50 pages, no date.

M. Wahl, et al, "Lightweight Directory Access Protocol (v3): UTF-8 String Representation of Distinguished Names", The Internet Society, 10 pages, no date.

T. Howes, "The String Representation of LDAP Search Filters", The Internet Society, 8 pages, no date.

M. Wahl et al, "Lightweight Directory Access Protocol (v3): Attribute Syntax Definitions", The Internet Society, Dec. 1997, 32 pages.

Melbourne, "The Directory—Overview of Concepts, Models and Services", 1988, 47 pages.

"Information Technology—Open Systems Interconnection—The Directory: The Models", Recommendation X.501, ISO/IEC 9594-2, Feb. 14, 1993, 164 pages.

\* cited by examiner

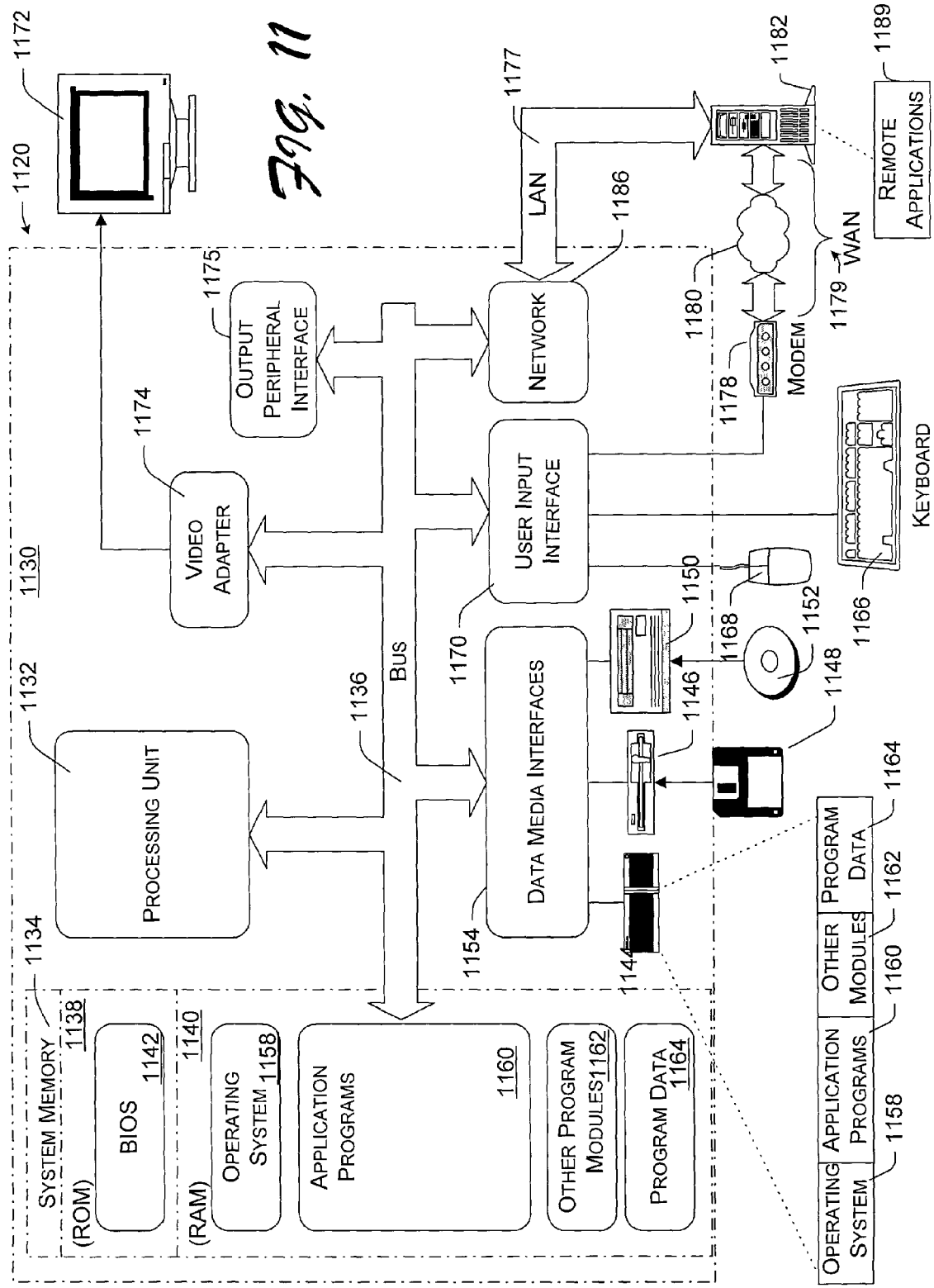

WORKFLOW MANAGEMENT BASED ON AN INTEGRATED VIEW OF RESOURCE IDENTITY

TECHNICAL FIELD

The following subject matter pertains to workflow management. More particularly, the described arrangements and procedures pertain to dynamically executing and managing workflow management in response to state changes in a directory.

BACKGROUND

All large corporations, and many small to medium sized organizations, face significant challenges in coordinating the provisioning of resources for employees and contractors. Every time a new application is installed or a new employee is hired, administrators must create multiple directory entries to match (e.g., grant or authorize access) users to the proper resources. Thus, simple events such as a new hire can turn into a laborious exercise, requiring enrollment in e-mail systems, intranet systems, remote-access systems, computers and corresponding peripheral hardware may need to be ordered, telephones provisioned, office space allocated, and the like. Similarly, if an employee leaves the company, you must judiciously remove the user from all these systems and resources.

In light of this, promotions, transfers, mergers, acquisitions, divestitures, marriage, divorce, name changes, and so on, can cause substantial logistical problems that can not typically be solved with a simple drag and drop of directory objects from one domain to another. Instead, users or resources must generally be deleted from one domain and then completely re-created in another domain; not to mention the logistical problems caused by moving entire groups of users and/or resources between domains. Thus, in today's fast-paced world of mergers, acquisitions, divestitures, and reorganizations, ensuring that employees have proper access to company resources can be a full-time job for an army of information technology workers.

These resource provisioning activities traditionally occur within organizations in an uncoordinated and decentralized fashion, and often result in delays, duplication of administrative effort, and unnecessary expense. For example, the costs show up with an increasing number of calls to a help desk because directories aren't synchronized or because users can't access physical resources or applications. However, it's not just about cost and replication of effort; it's also about risk. The risks of provisioning in an uncoordinated and decentralized fashion become evident when users who are no longer with a company still exist in some of the directories and can access the company's valuable resources.

Many organizations have developed their own jury-rigged solutions to the problems of automating the provisioning process by using a workflow, which is a series of predefined actions or procedures to coordinate complex sequences of actions. Workflows have always been expensive to produce, inflexible, and difficult to maintain. For example, one problem with conventional procedures to implement workflows is that workflows are typically based on a "fire and forget" paradigm. The "fire" aspect means an individual such as a network administrator is generally required to manually identify and execute a particular workflow sequence to implement a predefined policy in response to a specific event. This is a problem because there can be any number of workflows used to implement policies within an organization. Locating a proper workflow to implement in a timely manner is not always a simple procedure and it is susceptible to human error.

The "forget" aspect of the fire-and-forget paradigm of conventional workflow implementation means that even though group policies are typically based on a domain or unit within an organization, no one particular entity such as a network administrator (typically has an easy way to predict which machines or resources will be affected by a workflow. This is especially true in a distributed networking environment, where peripheral devices may be added and removed from the network at any time. Additionally, because a workflow may consist of any number of long running operations that can take hours, weeks, or longer to complete, there is no easy way for an administrator to coordinate transactions and/or monitor statuses such as the success or failure of the tasks that are implemented by the workflow.

Moreover, once workflows have been implemented, it is typically not a simple task for an administrator to determine which particular workflow of multiple workflows was used to implement a particular policy that affected machines and/or resources.

For instance, consider that a particular workflow is executed to implement a policy granting one or more computers or users on a network access to specific network resources or physical facility resources to which the computers/users previously had no access. Afterward the workflow has been implemented, it is determined that one or more machines or users were erroneously granted access to those network resources or physical facilities. It may be crucial to organizational interests (e.g., security) to determine exactly which machines, users, and/or resources were affected by the workflow. However, to accomplish this it will be necessary to identify the particular workflow that resulted in the erroneous grant of resources. Unfortunately, traditional workflow systems and procedures do not typically provide an easy way for an administrator to identify such information.

These types of problems also arise within "hire-and-fire" scenarios within an organization. For instance, after a person leaves an organization, an administrator must typically coordinate the inverse of any provisioning that occurred from when the person was hired to the time that the person left the company's employment. The organization's provisioning may have been implemented by any number of various workflows. Unfortunately, traditional workflow systems and procedures do not typically provide an easy way for an administrator to identify the one or more workflows that may have been used to provision the person. Thus, any modification to the person's network and physical resource access, and any modification to associated business operations to reflect the persons new non-employee status is typically performed in an uncoordinated and decentralized fashion, possibly resulting in delays, duplication of administrative effort, unnecessary expense, and increased risk.

Yet another problem with traditional workflow implementations are that they are not typically "self-healing", or self-correcting. This means that if a particular operation of a workflow fails in some manner, one or more corrective actions may not be taken in response to the failed operation. In other words, if a computer that is executing one or more aspects of a workflow malfunctions or for some other reason becomes unavailable, there is typically no mechanism to ensure that conditional aspects of a workflow that may have depended on un-implemented or failed aspects of the workflow have been satisfied. Additionally there is not mechanism to ensure that the un-implemented (or failed) aspects of the workflow are eventually implemented. This lack of a self-correcting behavior is especially important to consider in a distributed computing environment, wherein more than one computer, and possibly dozens, hundreds, or even thousands of computers may be involved in executing any one task or operation of a workflow.

The following arrangements and procedures address these and additional problems of traditional systems and procedures to define and implement workflows.

SUMMARY

The described arrangements and procedures use a directory, with its integrated view of resource identity across a distributed system to dynamically execute and manage workflow solutions responsive to changes in the directory. Specifically, a state change to an object in a directory is detected. Responsive to detecting the state change, the state change is mapped to a corresponding workflow, which includes sequences of tasks. The identified sequences of tasks are then executed to achieve a desired state in the directory. The desired state is based on the detected state change.

BRIEF DESCRIPTION OF THE DRAWINGS

FIG. 2 shows that a class with attributes is typically represented by a rectangle divided into two regions.

FIG. 11 illustrates aspects of an exemplary computing environment to manage provisioning in response to directory-based events.

DETAILED DESCRIPTION

The description sets forth an exemplary implementation to dynamically execute and manage a workflow using directory-based technology. The implementation incorporates elements recited in the appended claims. The implementation is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Overview

The described subject matter uses a directory, with its integrated view of resource identity across a distributed system to implement workflow solutions. By using the directory to coordinate the execution of tasks in a defined sequence, and to track the status of tasks within the directory until the tasks converge onto a desired directory state, the described subject matter provides a completely new way of approaching, implementing, coordinating and monitoring workflow tasks.

Because semantics of the described arrangements and procedures to implement a workflow are based on a workflow enabled directory schema, a schema including workflow base content classes that can be extended independent of any modification to the schema is first described. Additionally, procedures to extend the data providing and/or operational characteristics of object instances based on a directory schema independent of schema modification are described. Furthermore, a "provisioning" enabled directory schema, a system, and a procedure to integrate workflow with a directory are described.

A Schema

A schema is a collection of content classes and associations that abstract items, or "objects" that tangibly or intangibly exist in the real world. A content class models a set of items that have similar properties and fulfill similar purposes. A content class defines the purpose or content of an item by containing as its elements a list of properties appropriate for that purpose or content. Content classes imply a set of semantic requirements for the item. Content classes follow a hierarchical structure.

Classes can have subclasses, also referred to as specialization classes. The parent class of a subclass is referred to as a superclass or a generalization class. A class that does not have a superclass is referred to as a base class. A subclass inherits properties of its superclass. All properties and methods of a superclass apply to the subclass.

Figure 1:
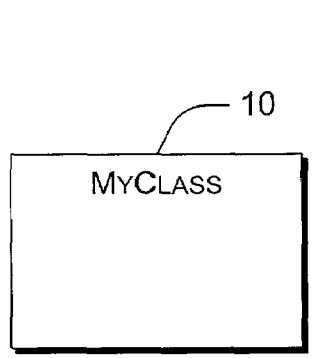
FIG. 1 shows a conventional object-oriented object class representation.
Figure 2:
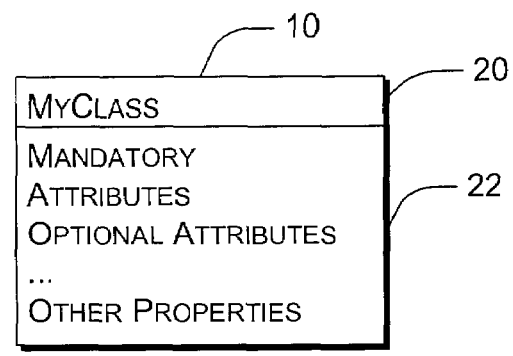
FIG. 2 shows further aspects of conventional object-oriented object class representation. Specifically.
Figure 3:
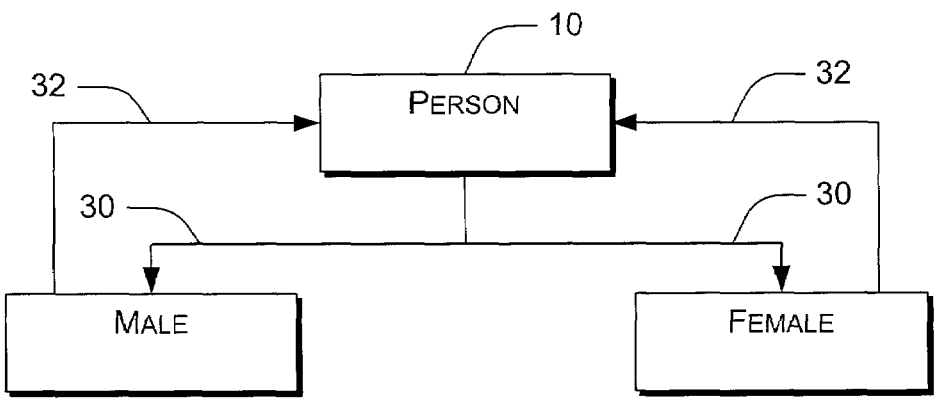
FIG. 3 shows that class inheritance, or a line drawn between the subclass and the superclass conventionally represents a subclass/superclass relationship between classes.

A class 10 is represented by a rectangle containing the name of the class. FIG. 1 shows an example. A class with attributes is represented by a rectangle divided into two regions as in FIG. 2, one region containing the name of the class 20 and the other region including a list of properties 22 such as what attributes are mandatory, what attributes are optional, and other properties such as what content class can be a parent of the current content class.

Class inheritance represents a subclass/superclass relationship between two or more classes. Most content classes will extend ("inherit") an existing content class. To extend a content class means that all of the properties on instances of the extended (derived) content class also exist on instances of the extending (base) content class. The act of creating an object of a particular class (or "data type") is called "instantiation" of the particular class, thereby creating an "object instance" of the class. An object instance is a collection of values, or attributes that conform to the type established by the class definition. Hereinafter, the term "object" may be used to refer to either an instance or a class.

Class inheritance can be within a namespace or across namespaces. A namespace is simply any bounded area in which standardized names can be used to symbolically represent some type of information (e.g., an object in a directory or an Internet Protocol [IP] address) that can be resolved to the object itself. Inheritance is typically represented by a line drawn between a subclass and a superclass, with an arrow adjacent to the superclass indicating the superclass. Lines representing inheritance from a base class are indicated by reference numeral 30. Associations are conventionally shown as a line between two classes, as indicated by reference number 32.

A Directory Schema

Directory schemas are typically very carefully designed to provide content classes to meet present and future requirements of a directory. However, directory schemas are often extended to meet needs of the directory that were not foreseeable at the time that the schema was designed. For instance, just because one version of a product works with the directory schema, does not mean that other or new product versions or different products will properly function with the schema. Specifically, any variation of the type information required by a product or product versions over time generally results in the need to extend the directory schema to specifically represent each piece of interesting information that a new product or a new version of the product requires to properly operate. Because of this, third parties typically extend directory schemas to create new content classes and attributes.

Conventional practice, however, is to strictly control directory schema updates because modifying a directory schema requires specialized knowledge and can have complex, serious, and far-reaching consequences for customers. For example, extending directory schemas to support specific products and product versions means that these different products and product versions will have mutually exclusive schemas. Thus, a product that was usable with one schema may become unusable with a different schema.

For instance, suppose object X is an instance of class Y. Class Y has an attribute, Z. Therefore, because object X is an instance of class Y, object X can have this attribute defined on it. Assume that X does indeed have this attribute currently defined in it. Now a schema update is performed that modifies class Y by deactivating attribute Z. Note that this change makes the instance of object X invalid because X now has an attribute, Z, which X is not allowed to have according to the class definition of Y (of which object X is an instance).

Additionally, directory schema extensions or additions are not reversible and always add to the size of the schema. In other words, once a class or attribute has been added to the schema it cannot simply be removed from the schema once it is no longer required. Continuous schema growth due to schema extension results in a problem that is generally referred to as "schema bloat".

The size of a directory schema or schema bloat becomes relevant when considering that schema changes are global to a distributed computing environment. An extended schema needs to be globally replicated to every domain server on the network. I.e., a distributed directory shares a common directory schema for the entire forest of directory trees that are organized as peers and connected by two-way transitive trust relationships between the root domains of each tree; when the directory schema is extended, the forest is extended.

The collection of data that must be copied across multiple servers (i.e., the unit of replication) during schema replication is the domain. A single domain may contain a tremendous number or objects (e.g., millions of objects). Thus, schema extensions typically result in a substantial amount of replication traffic across the globe on multiple servers—and the larger the schema, the larger the amount of replication traffic.

Moreover, schema replication procedures may result in replication latencies across servers in the distributed environment, causing temporary inconsistencies between various server versions of the schema. For example, consider that a new class A is created at server X, and then an instance of this class B is created at the same server X. However, when the changes are replicated to another server Y, the object B is replicated out before the object A. When the change arrives at server Y, the replication of B fails because server Y's copy of the schema still does not contain the object A. Hence, Y does not know about the existence of A.

In light of these considerations, it is apparent that schema extensions typically require a substantial amount of computing resources and data bandwidth as well as coordination between network administers to ensure that legacy applications in various domains properly operate with the updated schema. Accordingly, installing products on organizational networks that require directory schema changes can be risky, potentially politically difficult, and a time-consuming process.

The following arrangements and procedures address these and other problems that are associated with schema extensions by providing a workflow enabled schema with content classes that can be extended independent of schema modifications.

A Directory Schema with Flexible Objects and Attributes

Figure 4:
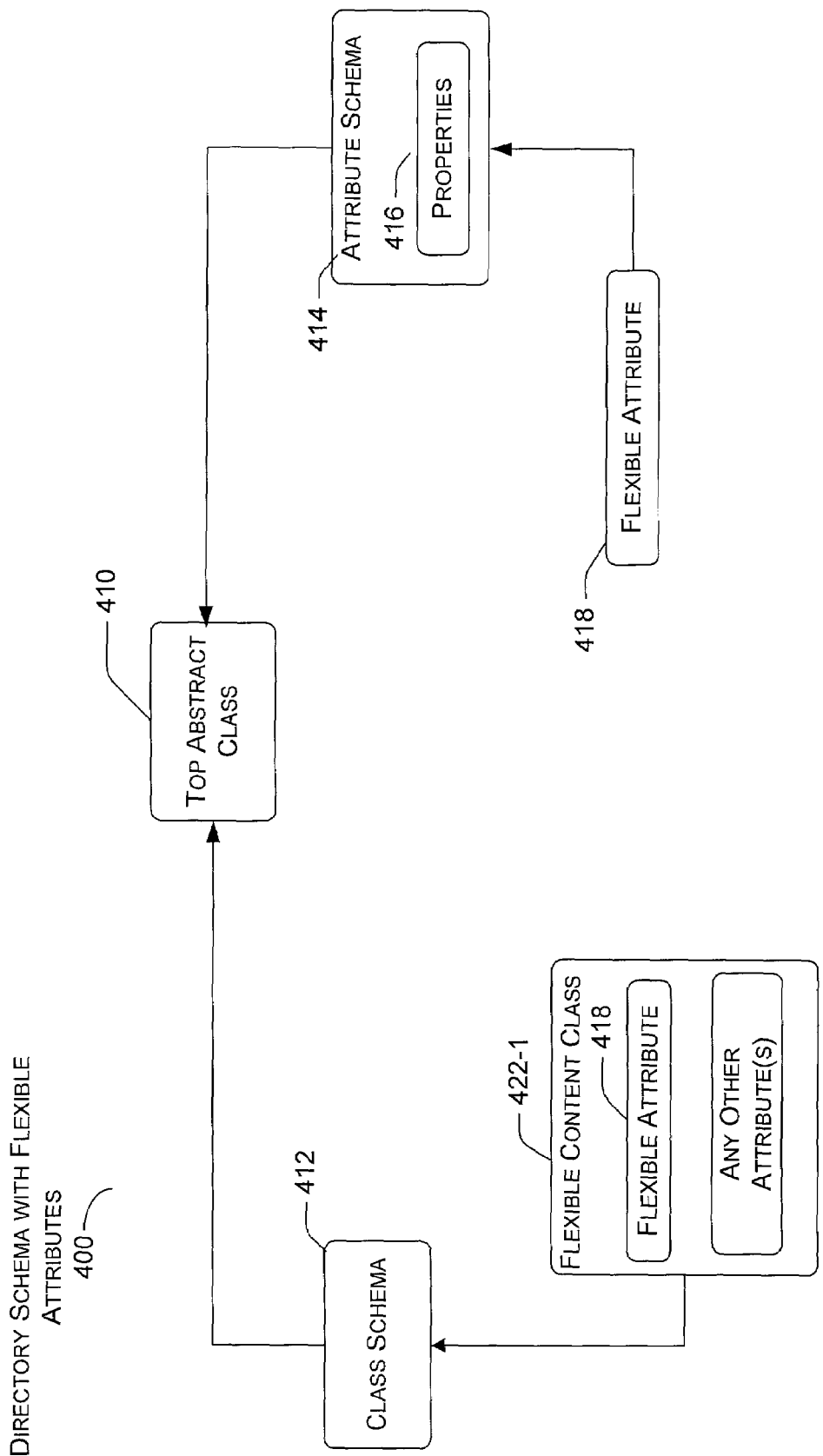
FIG. 4 shows a directory schema having a flexible attribute. A flexible attribute's operational and/or data providing nature can be changed in various object instances that include the attribute without requiring directory schema modifications.

FIG. 4 shows a directory schema 400 with attributes that can be extended independent of schema modifications. Specifically, the directory schema 400 includes a "top" or parent class 410. All other classes in the schema (e.g., the class schema class 412 and the attribute schema class 414) inherit from the top abstract class. The top abstract class includes a number of attributes (not shown) such as an X500 access control list (X500 is a well known directory protocol), any directory schema extension specific information, and other information that can be used by a directory service to instantiate the directory schema 400.

All directory schema 400 structural objects (other than "top") inherit properties from the class schema class 412. Structural content classes (with the exception of the "top" content class) include only those attributes that are defined by the attribute schema class 414 or those attributes defined by content classes that have been derived from the attribute schema class 414. We now describe properties of the attribute schema content class.

The Attribute Schema Content Class

The attribute schema class 414 provides for a number of properties 416. Any attribute class 418 is derived from the attribute content class 414 will inherit these properties.

The properties 416 include:

"cn", or common-name—every object in a directory has a naming attribute from which its relative distinguished name (RDN) is formed. The naming attribute for attribute schema objects is "cn", or common-name. The value assigned to "cn" is the value that the attribute schema object will have as its RDN.

lDAPDisplayName—the name used by Lightweight Directory Access Protocol (LDAP) clients, to read and write the attribute using the LDAP protocol. An attribute's lDAPDisplayName is unique in the schema 400 container, which means it must be unique across all class schemas 412 and attribute schema 418 objects.

description—a text description of the attribute.

adminDisplayName—a display name of the attribute for use in administrative tools.

isSingleValued—a Boolean value that is TRUE if the attribute can have only one value or FALSE if the attribute can have multiple values. If this property is not set, the attribute has a single value.

searchFlags—an integer value whose least significant bits indicate whether the attribute is indexed. The bit flags in this value are: 1=index over attribute only; 2=index over container and attribute; 4=add this attribute to the ambiguous name resolution (ANR) set; 8=preserve this attribute in a tombstone object for deleted objects; 16=copy the attribute's value when a copy of the object is created.

isMemberOfPartialAttributeSet—a Boolean value that is TRUE if the attribute is replicated to the global catalog or FALSE if the attribute is not included in the global catalog.

systemFlags—an integer value that contains flags that define additional properties of the attribute such as whether the attribute is constructed or non-replicated.

systemOnly—a Boolean value that specifies whether only a directory service can modify the attribute.

objectClass—identifies the object class of which this object is an instance, which is the class schema 412 object class for all class definitions and the attribute schema 418 object class for all attribute definitions.

attributeSyntax—the object identifier of the syntax for this attribute. The combination of the attributeSyntax and oMSyntax properties determines the syntax of the attribute, that is, the type of data stored by instances of the attribute.

oMSyntax—an integer that is a directory service representation of the syntax.

oMObjectClass—an octet string that is specified for attributes of oMSyntax. For attributes with any other oMSyntax value, this property is not used. If no oMObjectClass is specified for an attribute with an oMSyntax, the default oMObjectClass is set. Usually, there is a one-to-one mapping between the attributeSyntax and the oMObject class.

attributeID—the object identifier (OID) of this attribute. This value is unique among the attributeIDs of all attribute schema 418 objects and governsIDs of all class schema 412 objects.

schemaIDGUID—a globally unique identifier (GUID) stored as an octet string. This GUID uniquely identifies the attribute. This GUID can be used in access control entries to control access to instances of this attribute.

attributeSecurityGUID—a GUID stored as an octet string. This is an optional GUID that identifies the attribute as a member of an attribute grouping (also called a property set). This GUID is used to control access to all attributes in the property set.

rangeLower and range Upper—a pair of integers that specify the lower and upper bounds of the range of values for this attribute. All values set for the attribute must be within or equal to the specified bounds. For attributes with numeric syntax the range specifies the minimum and maximum value. For attributes with string syntax the range specifies the minimum and maximum size, in characters. For attributes with binary syntax, the range specifies the number of bytes.

linked—an integer that indicates that the attribute is a linked attribute. An even integer is a forward link and an odd integer is a back link.

An Exemplary Flexible Attribute Content Class

A flexible attribute 418 class is derived from the attribute schema content class 414. Thus, the flexible attribute inherits the properties 416. Table 1 provides an example of the values of the flexible attribute 418 class.

TABLE 1

EXAMPLE OF FLEXIBLE ATTRIBUTE KEY PROPERTIES

| Properties 416 of Flexible Attribute 418 | Value |
|---|---|
| Cn | String |
| LDAPDisplayName | String |
| Description | This attribute contains XML information used by a service |
| AdminDisplayName | String |
| adminDescription | Directory ServiceInternal Use Only |
| is SingleValued | TRUE |
| SearchFlags | 0x0 |
| isMemberOfPartialAttributeSet | FALSE |
| Systemflags | Not Replicated |
| SystemOnly | FALSE |
| ObjectClass | Attribute Schema 414 of FIG. 4 |
| attributeSyntax | String (e.g., XML) |
| OMSyntax | 64 |
| oMObjectClass | |
| AttributeID | TBD |
| schemaIDGUID | TBD |

Although this example describes the flexible attribute 418 with respect to the use of XML, any other data format could be used rather than XML. For example, the attribute 418-1 could include a string in ASCII text format, or in a Hypertext Markup Language (HTML) document format, and/or the like. Significantly, the data type (e.g., "attributeSyntax") of the flexible attribute is a text string data type. An application using an object instance that includes the flexible attribute can store, for example, an XML string on the flexible attribute property "attributeSyntax". In this manner, the application can assign any type of information such as declarative conditions, operations, values, operational statuses, and so on, on the flexible attribute 418.

Accordingly, and in contrast to operational and data providing properties of conventional attributes that cannot be modified without modifying the directory schema, the operational and data providing properties of the flexile attribute 418 can be changed without requiring the directory schema to be modified. To illustrate this, we now describe an object class 422 that is designed to utilize the flexible attribute class 418.

An Exemplary Flexible Structural Content Class

The class schema content class 412 includes object class definitions for objects 422. There can be any number of content classes 422 that are derived from class schema 412. Flexible content class 422 is derived from class schema 412 and includes the flexible attribute 418. Any class that is derived from the extensible content class will inherit the flexible attribute.

An application using an object instance of a content class 422 can put, for example, an XML string on the flexible attribute 418. Thus, the application can assign any type of information such as data value, declarative conditions, operations, operational statuses, and/or the like, on the flexible attribute 418. This ability for an application to modify the operational and/or data providing nature of a directory object that includes the flexible attribute is accomplished without needing to modify the directory schema to create new structural object classes or attributes to include these various data and/or operational characteristics.

Accordingly, the described subject matter takes a new and more flexible approach to "extending" the capability of content classes that are defined in a directory schema. This is a substantial benefit over the inflexible structural content classes and attributes of conventional directory schemas.

An Exemplary Procedure to Extend a Schema

Figure 5:
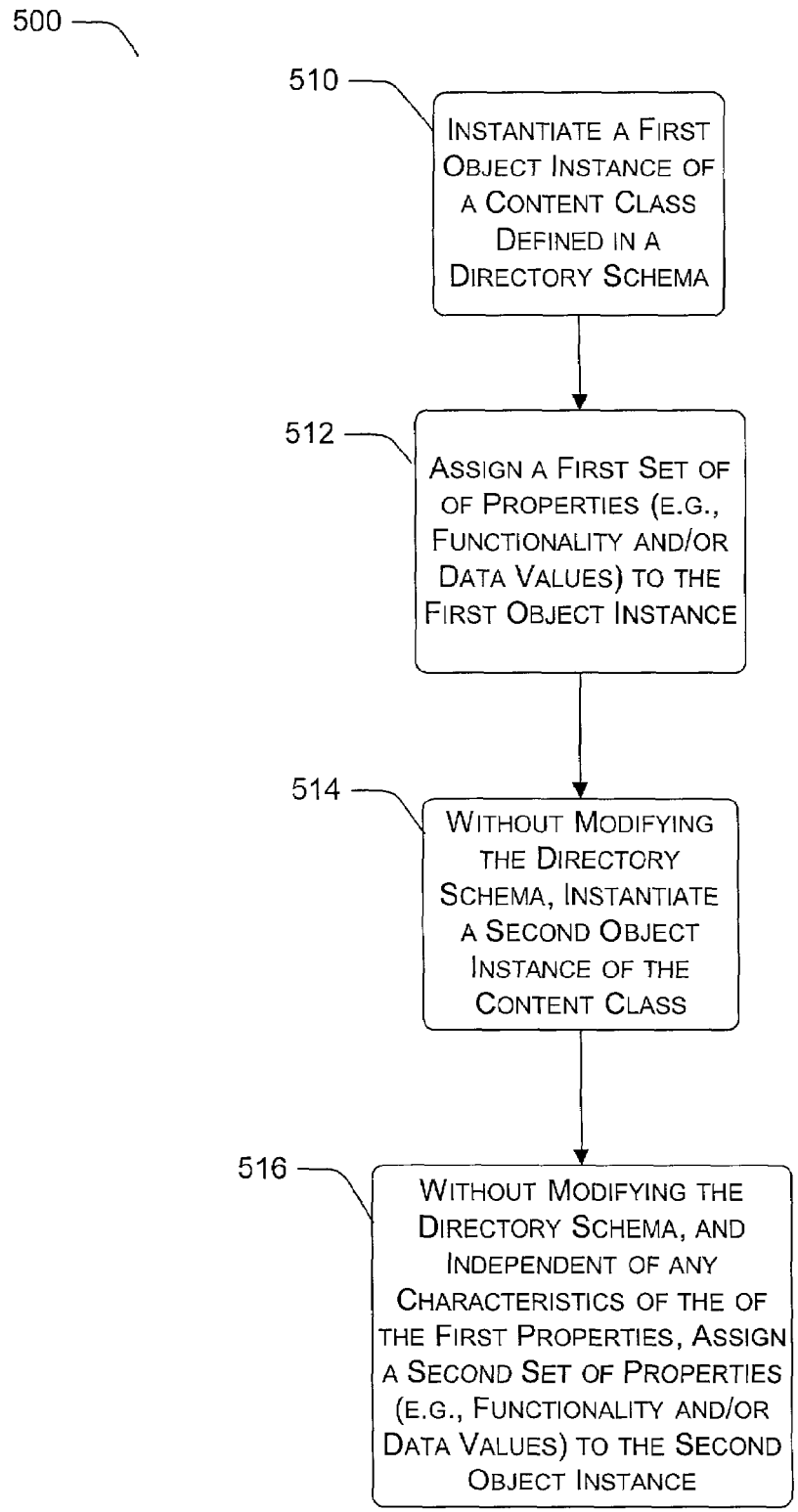
FIG. 5 shows an exemplary procedure to change the operational or data providing nature of multiple object instances of a base content class in a directory schema independent of modifying the directory schema.

FIG. 5 shows an exemplary procedure 500 to change the operational or data providing nature of multiple object instances of a base content class in a directory schema independent of modifying the directory schema. At block 510, the procedure instantiates a first object instance of a flexible content class 422.

At block 512, the procedure assigns a first data string (e.g., XML) to a flexible attribute 418 in the first flexible object instance (block 510), the first data string defines any combination of a first operational and a data providing nature of the first object instance. Specifically, an application that has instantiated or that is using the first object instance knows of the first object instance's interface and how to unpack and use the first data string.

At block 514, independent of any modification to the directory schema 400, the procedure generates a second object instance of the same content class 422 that was used to create the first object instance (block 510). At block 516, the procedure puts a second data string onto the second object instance. The second data string defines a second operational and/or data providing nature of the second object instance. The first and second operational and/or data providing natures do not need to be the same. Indeed, they can be completely different in all respects other than that they are represented in a text string. The application using the second object instance knows of the second object instance's interface and how to unpack and use the second data string.

For instance, consider that an application can assign the flexible attribute in the first instantiated object to have any combination of one or more data types (e.g., integer, real, string, floating, character, and so on), or operational properties (e.g., an operation can be defined to do just about anything imaginable such as to send an e-mail message, to report statistics, to manage a rocket launch, and so on). Whereas the flexible attribute in the second instance of the object can be assigned completely different properties that are independent of any characteristics of the data types or operations that correspond to the flexible attribute of the first instance of the object.

In yet another example, consider the following XML string shown in Table 2.

TABLE 2

EXAMPLE OF A FIRST STRING TO BE APPLIED TO A FIRST INSTANCE OF THE FLEXIBLE OBJECT

<data>
   <dataType>integer</dataType>

TABLE 2-continued

EXAMPLE OF A FIRST STRING TO BE APPLIED TO A FIRST INSTANCE OF THE FLEXIBLE OBJECT

<value>2</value>
   <name>integerValue</name>
<DataType>Real</DataType>
   <value>512.6</value>
   <name>realValue</name>
<dataType>integer</datatype>
   <name>result</name>
</data>
<operation>
   <integerVal + abs(realValue) = result>
</operation>

An application can assign the string of Table 2 to a flexible attribute 418 of type string in a first instance of a flexible object 422. In this case, the string of Table 2 provides both data and operational properties to the flexible attribute. Specifically: (a) an integer variable "integervalue" is defined with a value of two (2); (b) a real variable "realValue" is defined with a value of 512.6; and (c) an addition operation that adds integerValue to the absolute ("abs") value of realValue is defined. Thus, the XML string of Table 1 provides specific data and operations to the first instance of the object.

Now consider the following XML string of Table 3.

TABLE 3

EXAMPLE OF A SECOND STRING TO BE APPLIED TO A SECOND INSTANCE OF THE FLEXIBLE OBJECT

<application>www.somedestination.org/
applicationname.exe</application>

Independent of any modification to the directory schema, the application can assign the string of Table 3 to a flexible attribute 418 of type string in a second instance of a flexible object 422. In this case, the string of Table provides data. Specifically, the string identifies a Universal Resource Location (URL) of a computer program application.

In contrast to conventional schemas (wherein once an attribute is assigned a particular data type, only data of that predetermined data type can be represented by that attribute), a flexible attribute 418 can take on multiple values (e.g., integers, real numbers, operations, and so on) independent of the attributes 418 actual data type. Specifically, as the previous examples show, the described arrangements and procedures accomplish this independent of modifications to the directory schema to create corresponding content classes.

This multi-valued aspect of a single attribute of multiple object instances of the same base content class in a directory schema, allows a directory schema to be "versioning aware". Specifically, this is because application providers can upgrade and provide new products that utilize flexible attributes 418 without extending the directory schema. This allows third parties to provide products and product upgrades without extending directory schemas to take into consideration the specific needs of the products and product upgrades. Accordingly, a directory that is based on a directory schema 400 comprising object classes 422 with flexible attributes 418 is a "versioning aware" directory.

For example, consider the first XML string or document "<a>Data</a>". A first version of a product understands and extracts this first string. A third party or user can simply extend the first document to support additional product versions or a new product by appending new data to the original data. For example, the following information: "<b>Data2</b>" can be appended to the first document to obtain the following: "<a>Data</a><b>Data2</b>". In this case, the original data format of the first string is maintained and the first product versions (e.g., legacy applications) are able to continue operations using the original data format. New applications or product upgrades that are aware of new data (e.g., "<b>") can obtain the new data from the document.

Accordingly, while extending the data characteristics and/or operational functionalities of various object instances of a same directory schema base content class, the described arrangements and procedures completely avoid schema bloat as well as the complex and serious consequences of procedures to extend and replicate a directory schema because the directory schema is not modified.

An Exemplary Workflow Enabled Directory Schema

Figure 6:
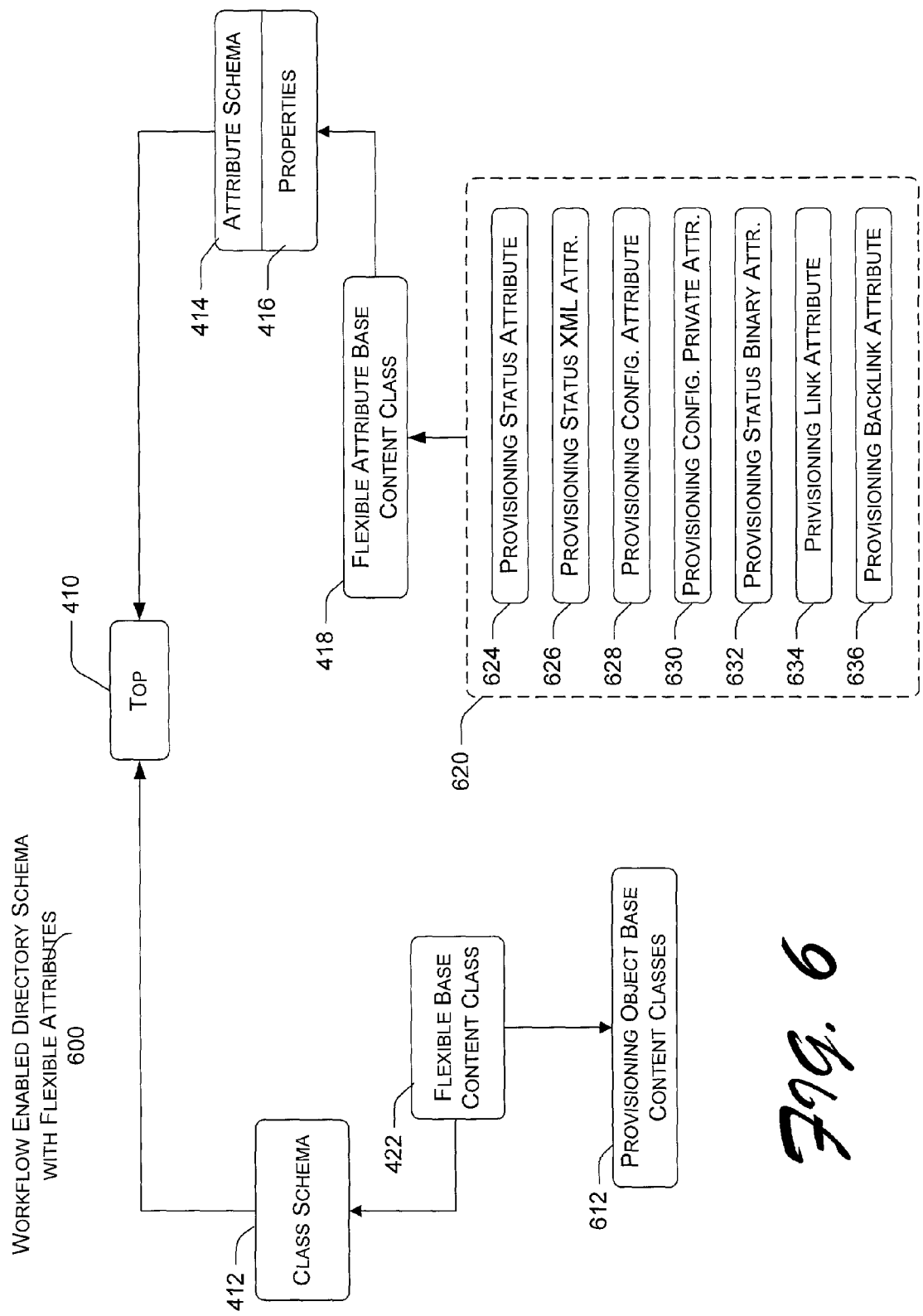
FIG. 6 shows an exemplary workflow, or "provisioning" enabled directory schema to integrate workflow management with directory-based technology.

FIG. 6 shows an exemplary workflow enabled directory schema 600 with flexible objects 612 and attributes 620 that integrate workflow management with directory-based technology. Specifically, the provisioning enabled directory schema 600 includes a "top" content class 410. All other content classes in the schema such as class schema base content class 412 and attribute schema base content class 414 inherit from the top class. Top includes a number of attributes (not shown) such as an X500 access control list (X500 is a well known directory protocol), any directory schema extension specific information, and other information used by a directory service to instantiate objects based on the directory schema 600.

All directory schema 600 structural objects (other than "top") inherit properties from class schema class 412. For instance, provisioning structural content classes 612 derive from flexible base content class 422 and class schema 412. These novel classes 612 are used to execute and manage provisioning in a distributed computing environment based on the dynamic detection of state changes in directory objects. These provisioning content classes are described in greater detail below in reference to FIG. 7.

Structural content classes can only include attributes (with the exception of "top" 610) that are defined by attribute schema class 616 or by classes derived from the attribute schema class. The attribute schema base content class 414 includes a number of properties 416. This attribute base content class 414 and these properties 416 have been described in detail above. Any attributed classes 620 derived from the attribute schema base content class 414 inherit these properties 416. For instance, provisioning attributes 620 derive from flexible attribute base content class 418, which in turn derives from the base attribute schema content class 414.

Provisioning Attribute Classes 620

The provisioning attribute content classes 620 include the provisioning status attribute 624, the provisioning XML status attribute 626, the provisioning configuration attribute 628, the provisioning configuration private attribute 630, the provisioning status binary attribute 632, the provisioning link attribute 634, and the provisioning back link attribute 636. Provisioning attribute 620 content class characteristics allow declarative conditions, operations, operational statuses, and so on, to be stored on object instances at any time to obtain various different behaviors and data types according to an application's needs. Thus, individuals can store various data type information onto a provisioning object instances (i.e., object instances provisioning classes 614) which include a flexible attribute. Although we show each of these attributes 620 as being derived from the flexible attribute, not all need to be. For instance, one or more of these provisioning attribute content classes may not be derived from the flexible attribute 418.

The Provisioning Status Attribute 624

An instance of the provisioning status attribute 624 stores the status information that corresponds to a workflow object 510 of FIG. 5. This storage is optional because there may be a policy about retaining this information (e.g., the information may not be retained because of a data storage issue). This status information is stored in an internal structure that contains the current execution status of the provisioning rules associated with this entry. The provisioning status attribute 624 is not indexed, replicated or included in a global catalog, and is only stored on the domain controller that the directory service instance is running on.

For example, an object instance that includes the provisioning status attribute is an XML document that includes the status of a provisioning policy for an entry in a directory. Although this example and some of the following examples describe the use of XML, any other document format could be used as well as than XML. For example, an instance object that includes the provisioning status attribute could store a document in ASCII text format, the Hypertext Markup Language (HTML) document format, and/or the like, on the attribute.

The Provisioning Status XML Attribute 626

The Provisioning-Status XML attribute 626 is one or more documents that store workflow based status information. This information is represented in a text string such as an XML representation of the status of a workflow, and will be stored on structural object instances of class provisioning status 512 of FIG. 5. This attribute is not indexed, replicated or included in the global catalog. It is only stored on the domain controller that the directory service instance is running on.

The Provisioning Configuration Attribute 628

An instance of the provisioning configuration attribute 628 content class stores one or more provisioning policies, or rules in a document data format such as in an XML data format. An instance of the provisioning configuration attribute 628 stores the provisioning policies as a document such as an XML document. This attribute is not indexed, replicated or included in the global catalog. It is only stored on the domain controller that the MMS service instance is running on.

The Provisioning Configuration Private Attribute 630

An instance of the provisioning configuration private attribute 630 content class provides an option to store private provisioning status information. In this implementation, the information is encrypted and only accessible by administrators by default. This attribute is not indexed, replicated or included in the global catalog, and is only stored on the domain controller that the directory service instance is running on.

The Provisioning Status Binary Attribute 632

The provisioning status binary attribute 632 is an octet string that stores a summary of status of executing workflows in the directory. This information is stored in an internal structure and consists of the object's globally unique ID (GUID) of the workflow, the GUID of the workflow step, and the status of the associated task. Whenever a new workflow object 510 of FIG. 5 is assigned to a provisioning status object 512, the information is added to the attribute and modified according responsive to changes in status. This attribute is not indexed, replicated or included in the global catalog.

The Provisioning Link Attribute 634

An instance of the provisioning link attribute 634 resides on a metadirectory object and indicates or references instances of the provisioning status structural content class 512 of FIG. 5, which is described in greater detail below. The provisioning link is a single-valued domain name (DN) that points to the associated entry in a directory partition that is being used to track the status of workflow (i.e., that is being used to store instances of the provisioning objects 510 through 520). An instance of the provisioning service structural class 518 of FIG. 5 writes this value to each user, group or organizational unit (OU) under the control of directory enabled workflow. In this manner, the attribute provides a backlink to automatically maintain inter-object relationships in the directory.

The provisioning link attribute 634 is not indexed, replicated or included in the global catalog. It is only stored on the domain controller that the directory service instance is running on.

The Provisioning Backlink Attribute 636

The provisioning backlink attribute 636 resides in the status object and provides a backlink that helps track an object that a provisioning agent 618 of has performed work on (e.g., executing one or more operations that corresponds to of a workflow object). The provisioning agent writes this value to each user, group or organizational unit (OU) under the control of directory enabled workflow. This attribute is not indexed, replicated or included in the global catalog. It is stored on the domain controller that the directory service instance is running on.

The Class Schema Structural Object Class

Figure 7:
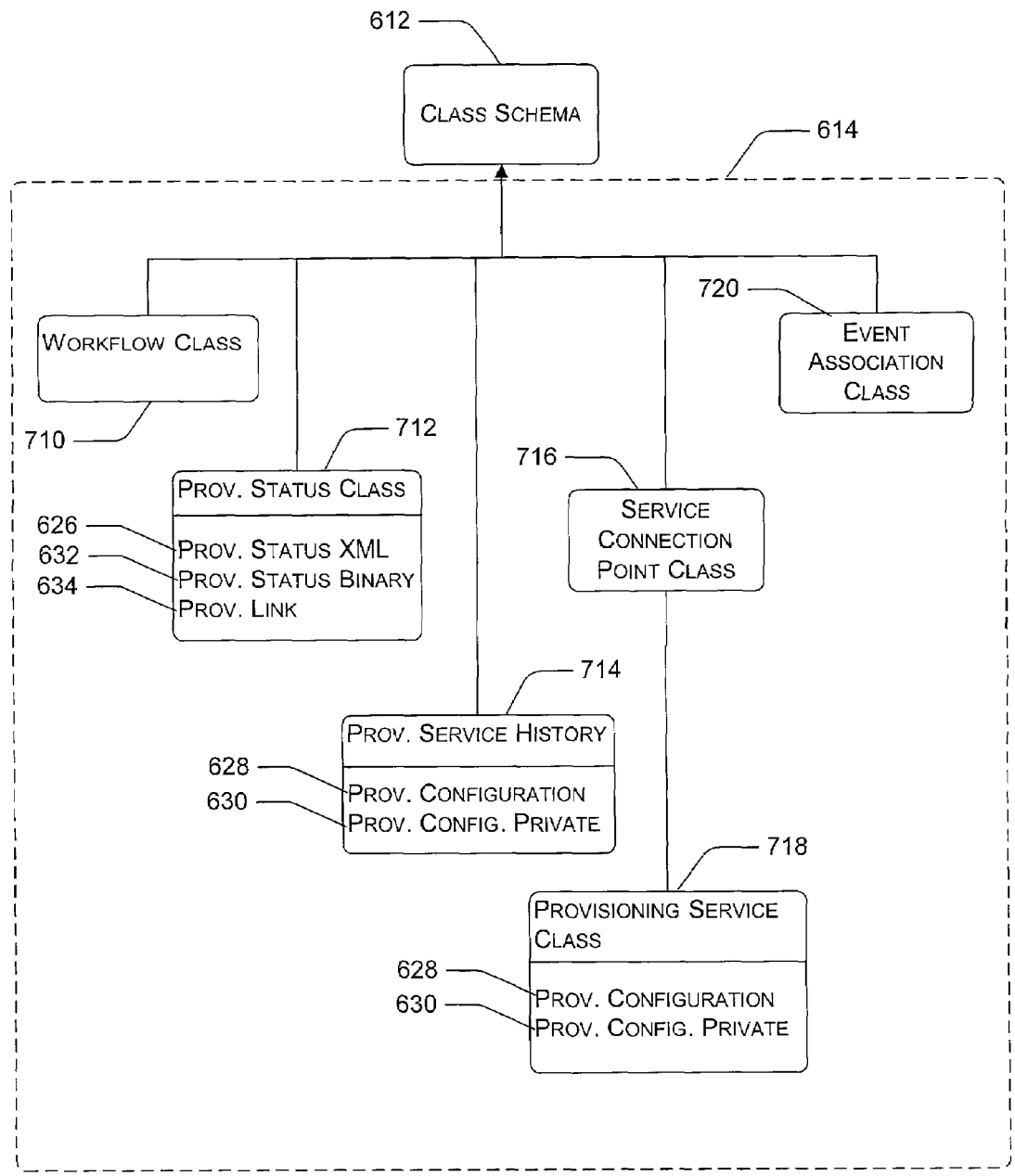
FIG. 7 shows further aspects of the workflow enabled directory schema.

FIG. 7 is a block diagram that shows further aspects of the provisioning structural classes 614 that are derived from class schema 612 of FIG. 6. The provisioning structural classes include: the workflow class 710, the provisioning status class 712, the provisioning service history class 714, the service connection point class 716, the provisioning service class 718, and the event association class 720.

Instance objects that correspond to these provisioning classes 614 can be stored in a domain-naming context (DNC) or in an application-naming context (ANC). However, in this implementation the provisioning instance objects are stored in a directory partition such as the ANC that is not necessarily, but rather optionally replicated to other domain controllers in a forest. Instances of workflow objects 710 and provisioning status objects 712 are stored in a connector space in a directory partition such as the ANC.

We now describe exemplary aspects and attributes of these classes.

The Workflow Structural Class 710

The workflow structural class 710 is used to store data format representations (e.g., XML representations) of workflows in a connector space such as the described ANC space. An instance of the workflow class 710 indicates a sequence of actions that correspond to a workflow. A workflow's sequences of actions are implemented and persisted within a system (i.e., a system 600 of FIG. 6 by a corresponding workflow process 622 that is based on class 710).

Table 4 illustrates an example of a workflow. In this implementation, a workflow is represented using XML.

TABLE 4

EXAMPLE OF A WORKFLOW REPRESENTATION
WITH A PRECEDENCE CONSTRAINT

```
<?xml version="1.0"?>
<Workflow>
    <WorkflowStep name="NotifyStart" ID="1">
        <task type="process"> . . . </task>
    </WorkflowStep>
    <WorkflowStep name="IWorkflow1" ID="2">
        <task type="COM"> . . . </task>
        <PrecedenceConstraints>
            <constraint ID="1" type="success"/>
        </PrecedenceConstraints>
    </WorkflowStep>
</Workflow>
```

The elements that comprise the workflow of Table 4 include a series of steps ("WorkflowStep") that identify two tasks, the "NotifyStart" task and the "Iworkflow1" task. The "NotifyStart" task has a "task type" that is a "process". The "IWorkflow1" task has a task type" that is a COM-based task. The workflow indicates that the "Iworkflow1" task has a precedence constraint ("PrecedenceConstraints") that requires the "NotifyStart" task to return with a status of "success" before the workflow will invoke the "IWorkflow1" task. This provides for the representation of any arbitrary sequence of steps in a workflow as a directed a-cyclic graph-any complex series of task based relationships, task status enumerations, and the like, can be represented. Such relationships include, for example, a task finish-start relationship, a parallel task execution relationship, simple and complex precedence constraint relationships, task priority relationships, and the like. Precedence or scheduling constraints are based on provisioning task success, failure, and completion determinations.

A workflow schema (i.e., the workflow schema 634 of FIG. 6) enforces the semantics of a workflow indicated by an instance of the workflow class 710.

Traditional techniques to implement a workflow typically require a workflow to schedule a "constrained" and/or "prioritized" task by looking forward to determine whether such constraints/priorities have been met. This means that a traditional workflow typically looks forward to analyze task constraint/priority relationships to determine if tasks should be executed. This is a problem because the complexity of a workflow increases at a rate that is substantially proportional to a square-root of the number of tasks that the workflow is coordinating.

In contrast to a traditional workflow implementations that typically require a workflow task to manage a constrained and/or prioritized task(s) by looking forward to determine the status of a condition, a workflow object 710 represents semantics of task precedence constraints and/or priorities by looking backwards, rather than looking forward. A task looks backward to determine if any constraints, conditions, priorities, and so on, have been satisfied prior to implementing its portion of the workflow. This substantially simplifies the complexity of representing, determining, and implementing task precedence/priority relationships. For example, task D looks back at task C to determine if C completed successfully before task D executes.

Moreover, a workflow object 710 provides for the representation of a substantial range of workflow task types and information. For example, a task can be a process, a Component Object Model (COM) object, identified with a Universal Resource Locator (URL), a Simple Object Access Protocol (SOAP) object, a message queue, an Microsoft Transaction Server® (MTS) transaction, and so on. (COM is a well-known binary code developed by Microsoft Corporation of Redmond, Wash. (SOAP is a well-known protocol that provides a way for applications to communicate with each other over the Internet, independent of platform).

The Provisioning Status Structural Class 712

A provisioning status structural class 712 instance tracks statuses of long-running workflows that may be executing on any number of different computers. This tracking is done from a centralized location in a distributed directory. To track workflow statuses, the object 712 may contain instances of the described provisioning link attribute 634 of FIG. 6, the provisioning status attribute 624, and/or the provisioning status binary attribute 632. These attributes allow a provisioning status structural object to store information such as XML and binary representations of workflow statuses.

An instance of the provisioning status object 712 is generated and used by an instance of the provisioning service/agent class 718 (see also, the provisioning service 618 of FIG. 6) to monitor a workflow's status, and to reflect the current and past conditions within a directory that are attributed to the workflow (e.g., as any directory resources affected by the workflow). The properties of this class indicate the sequences of actions that makeup a workflow along with status information that corresponds to the sequences. Detailed examples of how the provisioning service uses one or more provisioning status objects to track workflow are provided below in reference to FIGS. 6-8.

The Provisioning Service History Structural Class 714

An instance object of the provisioning service history structural class 714 is used by an instance object of the provisioning service/agent class 718 (see also, the provisioning service 818 of FIG. 8) to store the history of provisioning policies for an organization. This class does not contain any security principal attributes.

In one implementation, an object instance of the provisioning service history class 714 is stored in a container of a specified directory partition in the directory such as a container named "Provisioning Agent History".

Such organizational provisioning history status can be used by a data transformation service to record the history of package execution and data transformations (i.e., data lineage) for in the status information.

The Service Connection Point Structural Class 716

An instance of the service connection point structural class 716 represents an instance of a service object running on one or more computers on a network. (A service object is a program, routine, or process that performs a specific system function to support other programs). The class 716 provides for a service object to explicitly publish itself in a directory such as Active Directory®, thereby facilitating service-centric administration and usage.

The Provisioning Service Structural Class 718

The provisioning service/agent class 718 inherits from the connection point class 716. An instance object of the service/agent class 718 is a service object that executes on one or more computers on a network. Specifically, the provisioning service is a program module that coordinates and tracks workflow/provisioning policies in a distributed computing environment using directory-base technology.

To accomplish this, the service 718 monitors directory-based events as well as other events across the network and maps the detected events to defined workflows. An enumerated list of directory-based events is substantial because it includes all events that are propagated by a modification not only to the directory schema, but also to any objects or attributes defined by the directory schema. For example, directory-based events include creating a new directory object, deleting a directory object, renaming a directory object, synchronizing a directory object with an offline directory object, replicating a directory schema, and/or the like. (Detailed examples of how the provisioning service uses one or more provisioning status objects to track workflow are provided below in reference to FIGS. 6-8).

The provisioning service also keeps track of all the attributes and locations of shared provisioning objects (i.e., instances of provisioning content classes 710 through 720) across the distributed computing environment through its directory-based integrated view of resource identity.

The service/agent 718 explicitly publishes itself in a directory (via a corresponding connection point object 716) such as Active Directory® to facilitate service-centric administration of workflows in an organization.

A user that wants to communicate with an object instance of the provisioning service 718 may interrogate the "explicitly published" provisioning service using namespace syntax (e.g., "//workstation/provisioning agent"). Or, the provisioning service 718 may provides an abstraction layer (e.g., a dynamic-link library (DLL)) to hide the particular service location details within the distributed computing environment from client applications. The abstraction could query the directory service for a connection point object 716 representing the provisioning service/agent and use the binding information from that object to connect the client application to the provisioning service.

The Event Association Structural Class 720

The Event-Association structural class 720 is used to map declarative workflow conditions to particular instances of workflow objects 710. These provisioning-rule objects are stored in a container named after a provisioning service in the domain partition.

An instance object of the event association class 720 indicates an XML representation of directory events and maps them to already defined (although not necessarily instantiated) workflow (i.e., see workflow objects 710 of FIG. 7) based on a set of categorization rules that indicate declarative conditions (the categorization rules map an event to a particular workflow). A second property of the event association attribute indicates a distinguished name (DN) of the particular workflow that is associated to the detected event. The DN also identifies the workflow object's location in a directory tree of a distributed directory.

An event association object's 720 declarative conditions are based on a type of event (e.g., an add event, a delete event, a rename event, and the like), a scope of the event (what portion of the directory tree the event occurred in), any filtering criteria (such as the structural content classes 710 through 720 of FIG. 7 or attribute values that are pertinent to the event), and the like.

To illustrate such event categorization rules, consider the following example, wherein an XML script is used to determine if a detected event (a directory-based event or otherwise) maps to a defined workflow (i.e., an instantiated workflow object 712) is shown in Table 5.

TABLE 5

EXAMPLE OF EVENT EVALUATION TO DETERMINE A DEFINED WORKFLOW

```
<?xml version="1.0"?>
<!-- Fire if: it is an ADD event and the objectClass is PERSON
AND the title attribute is EITHER PROGRAM MANAGER OR
PRODUCT MANAGER-->
<eventAssociationDoc>
    <expression>
        <logicalop optype="and">
            <event>add</event>
            <objectClass>person</objectClass>
            <logicalop optype="or">
                <attrConstraint name="title" comparator=
                "equals">Program Manager
                </attrConstraint>
                <attrConstraint name="title" comparator=
                "equals">Product Manager
                </attrConstraint>
            </logicalop>
        </logicalop>
    </expression>
</eventAssociationDoc>
```

The script's declarative conditions first identify the detected event's type to determine if it is an "add" event. (The scope of the event (the portion of the directory tree the event occurred in and which directory objects are/were effected by the event) is provided by the directory service 816 of FIG. 8). If the event is an "add" event, the script determines whether an object associated with the add event has a corresponding content class of "person". If so, the script determine if the object having a class of person has a corresponding "title" attribute of either "program manager" or "product manager".

In this example, if these declarative conditions are met, then a corresponding workflow (indicated by the workflow indication attribute) is executed. (The workflow structural content class 710 and workflow semantics are described above (see, also the workflow schema 828 and workflow processes 826 of FIG. 8).

Figure 8:
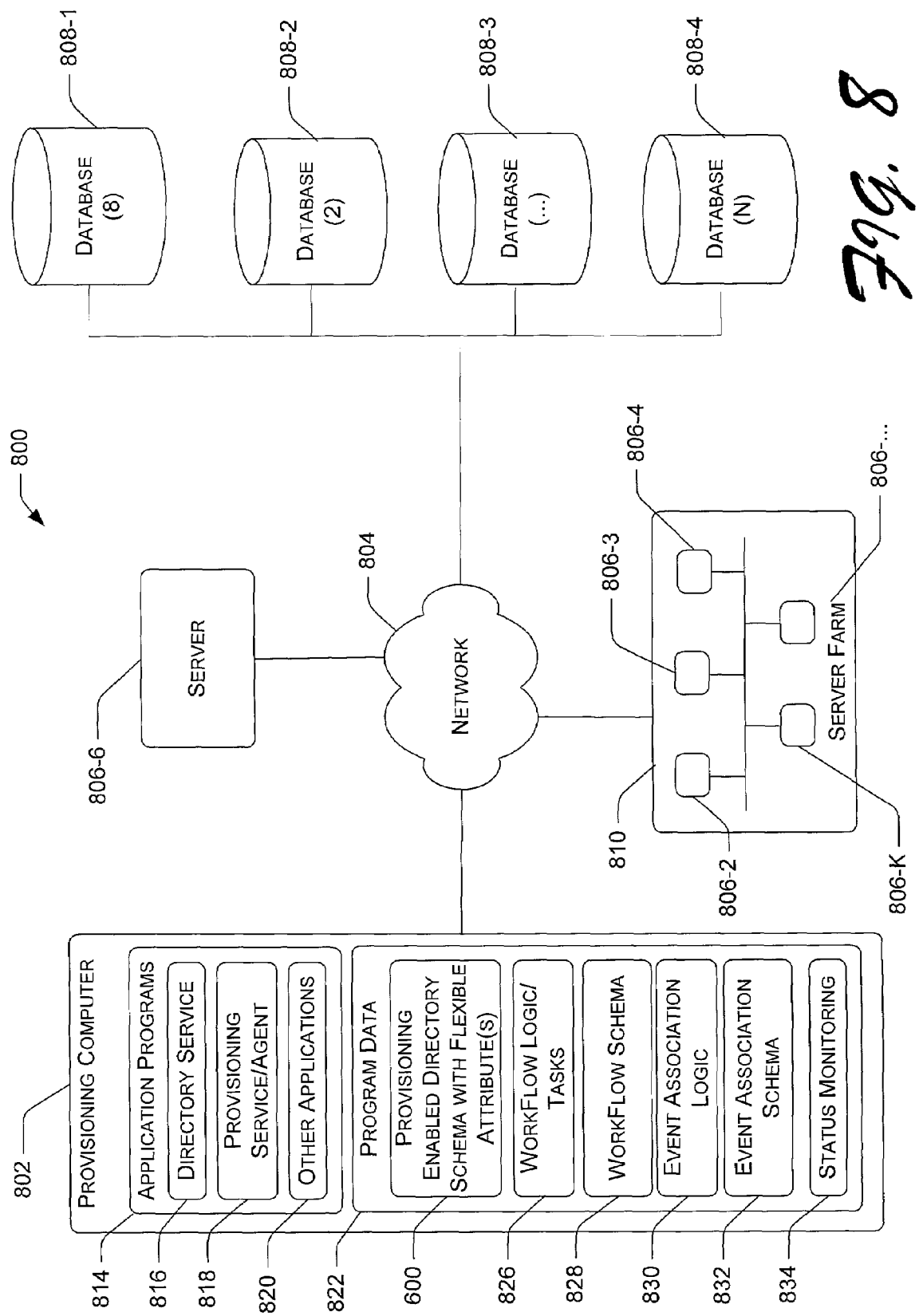
FIG. 8 shows aspects of an exemplary system to manage workflow based on distributed directory technology.

The semantics of an event association object's declarative conditions (e.g., the conditions shown in Table 5) are enforced by a schema such as an event association schema 832 of FIG. 8, which is based on the World Wide Web Consortium ("W3C") schema standard.

In yet another example of an event association object's 720 corresponding event categorization rules, consider the XML script shown in Table 6, which determines if a detected "directory modification" event maps to a defined workflow object 710.

TABLE 6

EXAMPLE OF EVENT EVALUATION TO DETERMINE IF A PARTICULAR WORKFLOW IS TO BE IMPLEMENTED

```
<?xml version="1.0"?>
<!-- Fire if:
it is a MODIFY event and
the employeeType attribute is REGULAR FULL TIME
AND the startDate attribute is less than July 6, 1998
-->
<eventAssociationDoc>
    <expression>
        <logicalop optype="and">
            <event>modify</event>
            <attrConstraint name="employeeType"
            comparator="equals">Regular Full Time
            </attrConstraint>
            <attrConstraint name="startDate"
            comparator="lt">1998-07-01</attrConstraint>
        </logicalop>
    </expression>
</eventAssociationDoc>
```

The declarative conditions shown in Table 6 first identify the detected event's type to determine if it is a "modify" event. If so, the script determines whether an object that corresponds to the modify event has an employee type attribute ("employeeType") indicating a regular, full time employee status ("Regular Full Time"). If so, the script determines if the object has an attribute that indicates a hire, or start date ("startDate") before a predetermined starting date (i.e., "1997-08-01"). In this example, if these declarative conditions are met, then a corresponding workflow identified by an associated workflow attribute (not shown) of the event association object is executed.

In this implementation, an event association's 720 declarative conditions are represented in XML and stored in a directory partition that is optionally replicated to other domain controllers. In yet another implementation, event association objects are represented as special structures in memory such as random access memory (RAM) for system performance reasons.

An Exemplary System

FIG. 8 shows an exemplary system 800 to integrate workflow management with distributed directory technology. The system provides a logically centralized, but physically distributed view of workflow that is based on a distributed directory infrastructure of machines and resources. In response to detected directory-based events such as changes in the directory infrastructure, the system implements, coordinates, and/or monitors a corresponding workflow across many different machines.

For example, in response to detected changes in a directory infrastructure, the system 800 automatically executes workflow tasks based on any precedence constraints and/or priorities between workflow tasks, provides workflow task status, identifies resources affected by a workflow, and/or provides for automatic implementation of corrective action in response to a workflow task failure. Thus, the system dramatically simplifies procedures to provision machines and resources such as user accounts, software configuration and updates, resource allocation, and the like.

Additionally, the system 800 executes a workflow until the convergence of a desired state of a number of objects in the directory is achieved (e.g., with respect to a group of directory objects representing tangible and intangible objects). For instance, each task in the workflow has one or more operations to implement. Upon failure of any operation, the task may retry the operation until the desired state is achieved.

To accomplish this, the system 800 includes a provisioning computer 802, which is turn is a domain controller for managing user access to distributed directory resources. The provisioning server streamlines internal organizational processes by distributing a workflow between other servers 806 and expediting computing processes by harnessing the power of the other servers. The provisioning server 802 is operatively coupled over a network 804 to the other servers 806 and one or more databases 808. One or more of the other servers 806 are also respective domain controllers for managing user access to directory resources.

In one implementation, the provisioning server 802 is operatively coupled to the network through one or more server appliances (not shown) located on the extreme outside of a server farm 810 such as a Web server farm, a corporate portal, or the like.

The provisioning server 802 includes a processor coupled to a memory. (Exemplary aspects of the processor and memory are described in greater detail in reference to processing unit 1132 and system memory 1134 in reference to FIG. 11). The processor is configured to fetch execute computer-executable instructions from application programs 814 and configured to fetch data from program data 822. The application programs include a directory service 816, a provisioning service 818, and other applications 820 such as an operating system and text string editing application (e.g., an XML editor).

The directory service 816 stores information about objects such as computers and resources on a network 804 and makes this information available to users and network administrators in a directory that ties disparate databases 808, or "directories" of data together into a single, logical directory, or "metadirectory". The only objects that can be represented in the distributed directory are those that meet the content class qualifications specified by the directory schema 600. Such databases 808 or directories include, for example, directories of enterprise users, resources, financial information, corporate e-mail systems, network operating systems, and the like. A database is an object-oriented database such as an XML database, a Hypertext Markup Language (HTML) database, an SQL server database, and so on.

The provisioning service 818 is an instance object of the provisioning service 718 class of FIG. 7. The provisioning service interacts with the directory service 816 to coordinate and manage workflows based on an integrated view of directory resource identity. One aspect of the directory service/provisioning service interaction is the respective propagation (i.e., the directory service) and corresponding receipt (i.e., the provisioning service) of directory-based events that correspond to directory object status changes. (An exemplary procedure 900 performed by the provisioning service is described in greater detail below in reference to FIGS. 9 and 10).

The provisioning service instantiates one or more workflow objects (based on content class 710), provisioning status objects (based on content class 712), service history objects (based on content class 714), provisioning service class objects (based on content class 718) based on a state change to an object in the directory. To monitor or detect directory-based events, the provisioning service 818 of FIG. 8 can be a Win32 service that monitors Lightweight Data Access Protocol (LDAP) directory synchronization ("Dirsync") control associated with an Active Directory® naming context to detect directory based events. (Win32 is a well-known WINDOWS® application programming interface (API). Techniques to interface with the LDAP directory synchronization control are well-known in the art of computer programming.)

Program data 822 includes the provisioning enabled directory schema 600, one or more workflow documents 826, a workflow schema 828, one or more event association documents 830, an event association schema 832, and one or more status monitoring documents 834 (for recording workflow status).

The particular workflows 826 to execute is/are determined by mapping the status change to one or more workflows using event association objects (based on content class 720) stored in the directory. Respective logic of the event association objects are represented by event association documents 830, the semantics of which are regulated by the event association schema 832. An event evaluation object indicates a set of declarative conditions that categorize/map a detected event to a defined workflow object 826. The declarative conditions are based on a type of event (e.g., an add event, a delete event, a rename event, and the like), a scope of the event (what portion of the directory tree the event occurred in), any filtering criteria (such as the structural content classes 710 through 720 of FIG. 7 or attribute values that are pertinent to the event), and/or the like.

An administrator defines the event/workflow mapping 830 as a text string such as an XML string. (See, for example, the XML event evaluation strings of Tables 2 and 3). Such a text string is "assigned to" a particular event evaluation object instance, which in turn is represented in the directory as an object/resource. Any number of various event evaluation objects can be defined and persisted in the directory. The semantics of event evaluation (e.g., such as the semantics expressed in Tables 2 and 3) are based on the event evaluation schema 832, which defines a number of allowable declarative conditions and/or sequences that can be used to determine if an event maps to a particular workflow. Thus, the event evaluation schema is used as part of event evaluation text string validation that determines if a defined event evaluation includes pre-defined elements/tags.

The sequences of tasks and information corresponding to the mapped workflows are represented by workflow documents 826. A workflow object indicates a set of declarative conditions and/or sequence of actions that correspond to the identified workflow. An administrator defines the conditions and/or sequences of actions that correspond to a workflow. As discussed, this workflow definition is a text string such as an XML string. (See, for example, the XML workflow string of Table 4). This text string is "assigned to" a particular workflow object instance, which is a directory object/resource. Any number of various workflow definitions can be defined and persisted in the directory.

The semantics of a workflow are based on the workflow schema 828, which defines a number of allowable declarative conditions and/or sequences that can be defined in a workflow string that is put on a corresponding workflow object 826. Thus, the workflow schema is used as part of workflow validation that determines if a defined workflow includes pre-defined elements/tags.

Once a particular workflow has been mapped to the directory object's status change, an object instance of the workflow base content class 710 can be generated with the corresponding sequence of tasks and data place onto the object's corresponding flexible attribute(s).

A provisioning status monitoring object 834 is an instance object of the status monitoring structural class 712 of FIG. 7. An instance of the provisioning status object 712 is generated and used by the provisioning service/agent 818 to monitor a workflow's 826 status, and to reflect the current and past conditions within a directory that are attributed to the workflow 826 (e.g., as any directory resources affected by the workflow). The properties of this class indicate the sequences of actions that makeup a workflow along with status information that corresponds to the sequences.

The generation of provisioning status objects, service history objects, and so on, is policy based.

Convergence of Workflow to a Desired Directory State

The system 800 provides a mechanism to converge the results of a sequence of tasks that define a workflow to obtain a desired directory state. Specifically, the provisioning agent 818 identifies each workflow that executes and the identity of the directory resource(s) that have been affected by a workflow. Additionally, any conditional aspects of a workflow that may depend on any un-implemented aspects of the workflow can be satisfied because if a computer or other resource used in workflow execution is not available (e.g., malfunctions, is taken off-line, etc.), the provisioning agent 818 records the unavailability and non-occurrence of the corresponding workflow operation(s) in the associated workflow status monitoring object 834. The provisioning service 818 can continuously retry failed or otherwise incomplete tasks of a workflow. If an unavailable resource becomes again available (e.g., back on-line) after its unavailability, the appropriate declarative conditions and operational sequences defined on the workflow object can ensure that the previously failed operation completes.

In light of this, the described provisioning system 800 provides a substantial level of self-correcting behavior while implementing organizational policies. This is especially important to consider in a distributed computing environment, wherein more than one computer, and possibly dozens, hundreds, or even thousands of computers may be involved in executing any one operation of the workflow.

Exemplary Procedure to Coordinate and Manage Provisioning

Figure 9:
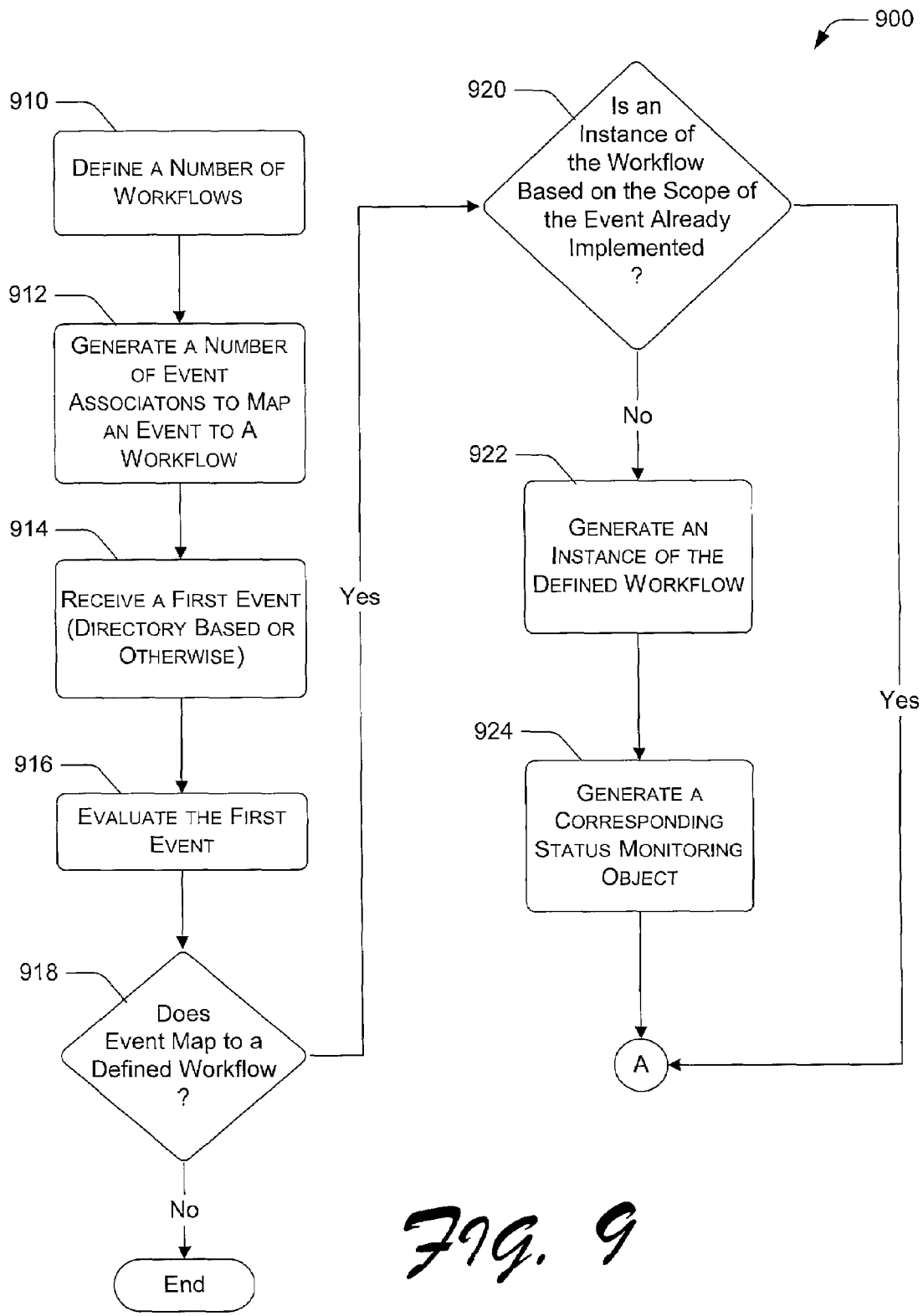
FIG. 9 shows an exemplary procedure to manage provisioning based on an integrated view of resource identity.

FIG. 9 is a block diagram that shows an exemplary procedure to manage provisioning based on an integrated view of resource identity. At block 910, the procedure defines a number of workflows. For example, an administrator may define one or more workflow text strings, which are put onto respective workflow objects 826 as described above. (See, also workflow class 710 of FIG. 7, and Table 4). At block 912, the procedure generates a number of event association objects 828, which are stored or persisted in the directory. (See, also event association class 720 of FIG. 7, and Tables 2 and 3).

At block 914, the procedure, receives an event that corresponds to a status change of a directory object. Specifically, the provisioning service 818 interacts with the directory service 816 to monitor events that occur in the directory such as events that occur in any one of a number of different naming contexts (e.g., a DNC, an ANC, and/or the like) in a metadirectory. Such events include directory-based events such as the addition, modification, deletion, or renaming of a directory object. The provisioning service also detects events other than directory-based events such as time-based events, user actions (e.g., clicking a mouse button or pressing a key), system occurrences (e.g., running out of memory), and the like. Accordingly, the types of events monitored by the provisioning service are customizable and extensible.

Responsive to receiving the event, at block 916, the procedure evaluates the event to map it to a workflow. To accomplish this, the provisioning service (or "provisioning agent") 818 categorizes the event to determine if there is an associated workflow that needs to be executed in response to the event. At block 918, the procedure determines if the event corresponds to a defined workflow based on the evaluation of block 916. If so, at block 920, the procedure determines if an instance of the workflow object based on the scope of the event (i.e., those directory resources affected or that will be affected by the event) is already implemented. If an instance of the workflow based on the scope of the event has already been instantiated (block 920), the procedure continues at block 810.

Otherwise, at block 922, the procedure 900 having determined that an instance of the workflow 826 based on the scope of the event has not yet been instantiated (block 920), generates an instance of the workflow object and places the identified workflow 826 onto the flexible attribute of the object. And, at block 924, the procedure optionally generates a corresponding provisioning status monitoring object 834 of FIG. 8 to monitor the status of the newly instantiated workflow (block 922). The procedure continues at block 1010 of FIG. 9.

Figure 10:
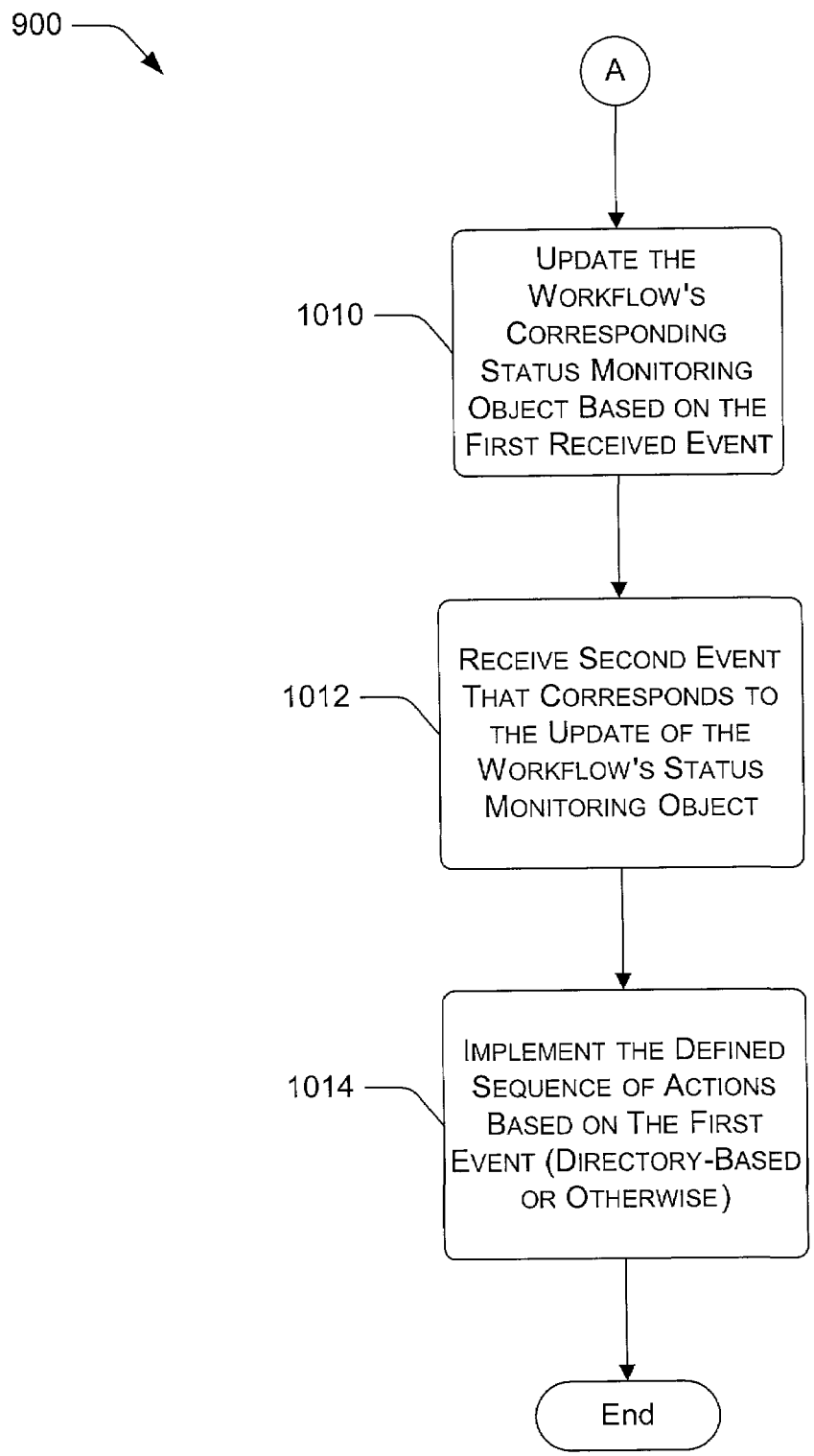
FIG. 10 shows further aspects of an exemplary procedure to manage provisioning based on an integrated view of resource identity.

FIG. 10 shows further aspects of an exemplary procedure to manage provisioning based on an integrated view of resource identity. At block 1010, the procedure updates the identified workflow's (see, blocks 920 and 922 of FIG. 9) status monitoring object (block 924 of FIG. 9) to indicate that the particular event was received. Such a status update may involve evaluating the sequence of operations that define the workflow (i.e., those stored on the monitoring object) to indicate workflow progress. For example, receipt of the event (block 914 of FIG. 9) may indicate the end/beginning of a particular workflow operation, the satisfaction of a declarative condition identified in the workflow, and/or the like. This indication is stored on the status object.

At block 1012, the procedure receives a second event. This second event corresponds to the provisioning agent's update of the provisioning status monitoring object (block 1010). At block 1014, the procedure re-evaluates sequence of operations and/or declarative conditions that make-up the workflow to determine the next step of the workflow to implement. In this manner, the provisioning service dynamically executes a workflow in response to directory events and coordinates and manages the provisioning process.

Exemplary Computing Environment

FIG. 11 illustrates an example of a suitable operating environment 1120 in which an exemplary provisioning service may be implemented. Specifically, the exemplary provisioning service(s) described herein is implemented (wholly or in part) by any program module 1160-462 and/or operating system 1158 or a portion thereof. Exemplary computing environment 1120 is only one example of a suitable computing environment and is not intended to suggest any limitation as to the scope of use or functionality of an exemplary provisioning service. Neither should the computing environment 1120 be interpreted as having any dependency or requirement relating to any one or combination of components illustrated in the exemplary computing environment 1120.

The exemplary provisioning service is operational with numerous other general purpose or special purpose computing system environments or configurations. Examples of well known computing systems, environments, and/or configurations that may be suitable for use with an exemplary provisioning service include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments such as server farms and corporate intranets, and the like, that include any of the above systems or devices.

An exemplary provisioning service may be described in the general context of computer-executable instructions, such as program modules, being executed by a computer. Generally, program modules include routines, programs, objects, components, data structures, etc., that performs particular tasks or implement particular abstract data types. An exemplary provisioning service may also be practiced in distributed computing environments where tasks are performed by remote processing devices that are linked through a communications network. In a distributed computing environment, program modules may be located in both local and remote computer storage media including memory storage devices.

As shown in FIG. 11, the computing environment 1120 includes a general-purpose computing device in the form of a computer 1130. Computer 1130 is a suitable device for the implementation of the provisioning computer 802 of FIG. 8. The components of computer 1120 may include, by are not limited to, one or more processors or processing units 1132, a system memory 1134, and a bus 1136 that couples various system components including the system memory 1134 to the processor 1132.

Bus 1136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 1130 typically includes a variety of computer readable media. Such media may be any available media that is accessible by computer 1130, and it includes both volatile and non-volatile media, removable and non-removable media. In FIG. 11, the system memory includes computer readable media in the form of volatile memory, such as random access memory (RAM) 1140, and/or non-volatile memory, such as read only memory (ROM) 1138. A basic input/output system (BIOS) 1142, containing the basic routines that help to transfer information between elements within computer 1130, such as during start-up, is stored in ROM 1138. RAM 1140 typically contains data and/or program modules that are immediately accessible to and/or presently be operated on by processor 1132.

Computer 1130 may further include other removable/non-removable, volatile/non-volatile computer storage media. By way of example only, FIG. 11 illustrates a hard disk drive 1144 for reading from and writing to a non-removable, non-volatile magnetic media (not shown and typically called a "hard drive"), a magnetic disk drive 1146 for reading from and writing to a removable, non-volatile magnetic disk 1148 (e.g., a "floppy disk"), and an optical disk drive 1150 for reading from or writing to a removable, non-volatile optical disk 1152 such as a CD-ROM, DVD-ROM or other optical media. The hard disk drive 1144, magnetic disk drive 1146, and optical disk drive 1150 are each connected to bus 1136 by one or more interfaces 1154.

The drives and their associated computer-readable media provide nonvolatile storage of computer readable instructions (e.g., the application programs 814 of FIG. 8), data structures, program modules, and other data (e.g., the program data 822 of FIG. 8) for computer 1130. Although the exemplary environment described herein employs a hard disk, a removable magnetic disk 1148 and a removable optical disk 1152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 1148, optical disk 1152, ROM 1138, or RAM 1140, including, by way of example, and not limitation, an operating system 1158, one or more application programs 1160, other program modules 1162 (e.g., a directory service 816 and a provisioning service agent 818), and program data 1164 (e.g., a provisioning enabled directory schema 824, a workflow document 826, a workflow schema 828, an event association document 830, an event association schema 832, and a status monitoring document 834).

Each of such operating system 1158, one or more application programs 1160, other program modules 1162, and program data 1164 (or some combination thereof) may include an embodiment of an exemplary provisioning service. More specifically, each may include an embodiment of a provisioning service 818, and a directory schema 600 that includes a plurality of provisioning objects for managing a workflow instantiated by the provisioning service. The provisioning service includes a number of services such as an event association service, a workflow process, a workflow status-monitoring process, and the like. The provisioning objects in the directory schema include event association objects, workflow objects, status-monitoring objects, and the like.

A user may enter commands and information into computer 1130 through input devices such as keyboard 1166 and pointing device 1168 (such as a "mouse"). Other input devices (not shown) may include a microphone, joystick, game pad, satellite dish, serial port, scanner, or the like. These and other input devices are connected to the processing unit 1132 through a user input interface 1170 that is coupled to bus 1136, but may be connected by other interface and bus structures, such as a parallel port, game port, or a universal serial bus (USB).

A monitor 1172 or other type of display device is also connected to bus 1136 via an interface, such as a video adapter 1174. In addition to the monitor, personal computers typically include other peripheral output devices (not shown), such as speakers and printers, which may be connected through output peripheral interface 1175.

Computer 1130 may operate in a networked environment using logical connections to one or more remote computers, such as a remote computer 1182. Remote computer 1182 may include many or all of the elements and features described herein relative to computer 1130. Logical connections include a local area network (LAN) 1177 and a general wide area network (WAN) 1179. Such networking environments are commonplace in offices, enterprise-wide computer networks, intranets, and the Internet.

When used in a LAN networking environment, the computer 1130 is connected to LAN 1177 via network interface or adapter 1186. When used in a WAN networking environment, the computer typically includes a modem 1178 or other means for establishing communications over the WAN 1179. The modem 1178, which may be internal or external, may be connected to the system bus 1136 via the user input interface 1170 or other appropriate mechanism.

Depicted in FIG. 11, is a specific implementation of a WAN via the Internet. Computer 1130 typically includes a modem 1178 or other means for establishing communications over the Internet 1180. Modem 1178, which may be internal or external, is connected to bus 1136 via interface 1170.

In a networked environment, program modules depicted relative to the personal computer 1130, or portions thereof, may be stored in a remote memory storage device. By way of example, and not limitation, FIG. 11 illustrates remote application programs 1189 as residing on a memory device of remote computer 1182. It will be appreciated that the network connections shown and described are exemplary and other means of establishing a communications link between the computers may be used.

Computer-Executable Instructions

An implementation of an exemplary provisioning service may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data is signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the provisioning service based on directory technology has been described in language specific to structural features and/or methodological steps, it is to be understood that the provisioning service based on directory technology defined in the appended claims is not necessarily limited to the specific features or steps described. Rather, the specific features and steps are disclosed as preferred forms of implementing the claimed present invention.

The invention claimed is:

1. In a distributed computing environment, a computer-implemented method for dynamically implementing a workflow responsive to state changes of objects in a directory, the directory comprising a network-based directory service providing storage and lookup of objects corresponding to resources, the workflow comprising stored information defining a plurality of tasks and flow between the tasks, the method comprising:
   automatically detecting a state change to an object in the directory, and
   responsive to detecting the state change, automatically:
      mapping the state change to the object to the workflow; and
      executing one of the tasks of the workflow;
   wherein the workflow comprises an XML string having a plurality of defined workflows and a set of categorization rules that map a detected event to the defined workflows.

2. The method of claim 1, wherein executing the task further comprises storing a change in state of the workflow corresponding to the one of the tasks.

3. The method of claim 1, wherein executing the task further comprises executing an operation of a task of the plurality of tasks until convergence of a desired state is identified.

4. The method of claim 1, wherein executing the task further comprises storing a sequence of operations based on the tasks.

5. The method of claim 1, wherein executing the task further comprises storing information corresponding to one or more directory objects to which the workflow applies.

6. The method of claim 1, wherein executing the task further comprises storing status information based on respective status of at least one other task of the workflow.

7. The method of claim 1, wherein mapping the state change to the object to the workflow further comprises evaluating the state change to the object based on a declarative condition stored as a text string on an object instance of a content class defined by a schema.

8. The method of claim 1, wherein one of the tasks comprises any combination of a declarative condition or an operation that is stored as a text string in an object corresponding to the one of the tasks.

9. The method of claim 1, wherein semantics of the workflow are based on a workflow schema.

10. The method of claim 1, wherein semantics of the mapping of the state change to the object to the workflow are based on an event association object schema.

11. The method of claim 1, wherein at least some of the tasks are executed with respect to one another based on an order of execution relationship comprising a finish-start relationship, a parallel execution relationship, a precedence constraint relationship, or a task priority relationship.

12. The method of claim 1, wherein at least some of the tasks are executed with respect to one another based on a precedence constraint relationship or a task priority relationship.

13. The method of claim 1, wherein the method further comprises: monitoring a status corresponding to a task of the tasks;
   storing the status on a status monitoring object; and
   wherein a content class in a directory schema defines the status-monitoring object.

14. The method of claim 1, wherein the method further comprises: monitoring a set of directory resources affected by the workflow;
   storing the directory resources on a status monitoring object; and
   wherein a content class in a directory schema defines the status-monitoring object.

15. The method of claim 1, wherein the method further comprises: monitoring a status corresponding to an operation of the workflow;
   determining that the status comprises a failure status; and
   responsive to the determining, taking a corrective action to advance the workflow in view of the failure status.

16. The method of claim 1, wherein executing the task further comprises:
   updating a status corresponding to the task in the workflow; and
   evaluating the workflow to determine that a next task of the tasks needs to be implemented.

17. The method of claim 1, wherein the tasks implement a policy with respect to one or more directory resources, and wherein mapping the state change to the object to the workflow further comprises automatically determining the workflow based on the policy.

18. One or more computer-readable storage medium comprising computer-executable instructions to implement a plurality of workflows responsive to state changes to objects in the directory, the directory comprising a network-based directory service allowing devices on a network to store, modify, and lookup objects corresponding to resources, the workflows comprising stored information defining respective pluralities of tasks and flow therebetween, the computer-executable instructions comprising instructions for performing a process, the process comprising:
   detecting a state change to an object in the directory, and responsive to detecting the state change:
      identifying, among the plurality of workflows, one of the workflows to which the object corresponds; and
      executing one or more tasks of the identified workflow;
   wherein the workflow comprises an XML string based on a set of categorization rules.

19. The computer-readable storage medium of claim 18, wherein the executing the task further comprises storing a state of the workflow as changed by execution of the task.

20. The computer-readable storage medium of claim 18, wherein the executing the task further comprises executing an operation of a task of the tasks until a desired state is identified.

21. The computer-readable storage medium of claim 18, wherein the executing the task further comprises storing a sequence of operations based on the plurality tasks.

22. The computer-readable storage medium of claim 18, wherein executing the task further comprises storing information corresponding to one or more objects in the directory to which the workflow applies.

23. The computer-readable storage medium of claim 18, wherein the executing the task further comprises storing status information based on respective status of at least one subset of the tasks.

24. The computer-readable storage medium of claim 18, wherein the identifying the workflow further comprises evaluating the state change to the object based on content of the object.

25. The computer-readable storage medium of claim 18, wherein a task of the tasks comprises any combination of declarative conditions and operations that are stored as a text string on one of the objects.

26. The computer-readable storage medium of claim 18, wherein semantics of the workflow are based on a workflow schema.

27. The computer-readable storage medium of claim 18, wherein the identifying the workflow is based on an event association object schema.

28. The computer-readable storage medium of claim 18, wherein at least some of the tasks are executed with respect to one another based on an order of execution relationship comprising a finish-start relationship, a parallel execution relationship, a precedence constraint relationship, or a task priority relationship.

29. The computer-readable storage medium of claim 18, wherein at least some of the tasks are executed with respect to one another based on a precedence constraint relationship or a task priority relationship.

30. The computer-readable storage medium of claim 18, wherein the computer-executable instructions further comprise instructions for:
   automatically:
      monitoring a status corresponding to a task of the tasks; and storing the status on a status monitoring object.

31. The computer-readable storage medium of claim 18, wherein the computer-executable instructions further comprise instructions for:
   automatically:
      monitoring a set of directory resources affected by the workflow; and
      storing indicia of the directory resources in a status monitoring object.

32. The computer-readable storage medium of claim 18, wherein the computer-executable instructions further comprises instructions for automated operations comprising:
   monitoring, by a status-monitoring object in the directory, a status corresponding to an operation of the workflow;
   determining that the status comprises a failure status; and
   responsive to the determining, taking a corrective action to advance the workflow in view of the failure status.

33. The computer-readable storage medium of claim 18, wherein the process further comprises:
   updating a status corresponding to a task in the workflow; and
   evaluating the workflow to determine that a next task of the tasks to be implemented.

34. The computer-readable storage medium of claim 18, wherein the tasks implement a policy with respect to one or more resources represented by objects in the directory, and the process further comprises automatically identifying the workflow based on the policy.

35. A computing device configured to perform a process, the process comprising:
   a memory;
   a processor coupled to the memory for executing computer-executable instructions, the computer-executable instructions comprising instructions for:
   detecting state changes to objects in a directory, the directory corresponding to a directory schema, the directory comprising a network-based directory service allowing devices on a network to store, modify, and lookup objects corresponding to resources; and
   responding to detecting the state changes by mapping the state changes to workflows, the workflows comprising stored information defining respective pluralities of tasks and flow therebetween, the mapping including determining which state changes correspond to which workflows; and executing tasks to which the state changes correspond, wherein the task executed for a state change is a task in a workflow that corresponds to the state change;

wherein the workflow comprises an XML string based on a set of categorization rules.

36. The computing device of claim 35, wherein the process further comprises storing the desired state.

37. The computing device of claim 35, wherein the executing the tasks further comprises repeatedly executing an operation of a task of the tasks until a desired state is identified.

38. The computing device of claim 35, wherein the executing the tasks further comprises storing a sequence of operations based on the tasks.

39. The computing device of claim 35, wherein executing the tasks further comprises storing information corresponding to one or more directory objects to which of the workflows applies.

40. The computing device of claim 35, wherein the executing the tasks further comprises storing status information based on respective status of at least one subset of the tasks.

41. The computing device of claim 35, wherein a task of the tasks comprises any combination of one or more declarative conditions and one or more operations represented by a text string stored on an object instance.

42. The computing device of claim 35, wherein semantics of the workflows are based on a workflow schema.

43. The computing device of claim 35, wherein semantics of the mapping are based on an event association object schema.

44. The computing device of claim 35, wherein at least some of the tasks in a workflow are executed with respect to one another based on an order of execution relationship comprising a finish-start relationship, a parallel execution relationship, a precedence constraint relationship, or a task priority relationship.

45. The computing device of claim 35, wherein at least some of the tasks of one workflow are executed with respect to one another based on a precedence constraint relationship or a task priority relationship.

46. The computing device of claim 35, wherein the process further comprises:

monitoring a status corresponding to a task of the tasks; and storing the status on a status monitoring object.

47. The computing device of claim 35, wherein the process further comprises:

monitoring a set of directory resources affected by the workflow; and storing the directory resources on a status monitoring object.

48. The computing device of claim 35, wherein the process further comprises:

monitoring a status corresponding to an operation of the workflow;

determining that the status comprises a failure status; and responsive to the determining, taking a corrective action to advance the workflow in view of the failure status.

49. The computing device of claim 35, wherein the process further comprises:

updating a status corresponding to a task in one of the workflows; and responsive to the updating, evaluating the workflow to determine that a next task of the tasks needs to be implemented.

50. The computing device of claim 35, wherein the process implements a policy with respect to one or more directory resources, and wherein the mapping the state changes to the objects further comprises instructions for automatically determining the workflow based on the policy.

51. A computer-readable storage medium storing information comprising a workflow enabled directory schema for automated workflow implementation responsive to state changes to objects in a directory that corresponds to the directory schema, the directory comprising a network-based directory service allowing devices on a network to store, modify, and lookup objects corresponding to resources, the workflow enable directory schema defining a plurality of base object content classes comprising:

a service class to detect an event corresponding to a state change in a directory object;

a workflow content class for storing a sequence of tasks of a workflow and operational flow between the tasks;

an event association content class for storing declarative conditions to map the state change to the directory object to a workflow object instance of the workflow content class; and wherein the service class is further configured to execute tasks of the workflow object instance;

wherein the workflow comprises an XML string based on a set of categorization rules.

52. The computer-readable storage medium of claim 51, wherein the schema further defines a base object content class comprising a flexible attribute data field that indicates a data type, the data type being used to express various operational or data providing properties of the flexible attribute, the various operational or data providing properties being independent of the data type and independent of any modification to the workflow enabled directory schema.

53. The computer-readable storage medium of claim 51, wherein the tasks comprise any combination of declarative conditions and operations corresponding to directory-based objects.

54. The computer-readable storage medium of claim 51, the schema$_{13}$ further defining a status monitoring class for storing a status of an object instance of the workflow content class.

55. A computer comprising the processor coupled to a memory comprising the computer-readable storage medium of claim 51.

* * * * *

UNITED STATES PATENT AND TRADEMARK OFFICE
CERTIFICATE OF CORRECTION

| | | |
|---|---|---|
| PATENT NO. | : 7,389,335 B2 | Page 1 of 1 |
| APPLICATION NO. | : 09/995004 | |
| DATED | : June 17, 2008 | |
| INVENTOR(S) | : Stewart P. MacLeod et al. | |

It is certified that error appears in the above-identified patent and that said Letters Patent is hereby corrected as shown below:

In column 30, line 51, in Claim 54, delete "$schema_{13}$" and insert -- schema --, therefor.

Signed and Sealed this
Nineteenth Day of April, 2011

David J. Kappos
*Director of the United States Patent and Trademark Office*